(12) United States Patent
Wu et al.

(10) Patent No.: US 10,277,618 B1
(45) Date of Patent: *Apr. 30, 2019

(54) PRIVILEGE INFERENCE AND MONITORING BASED ON NETWORK BEHAVIOR

(71) Applicant: ExtraHop Networks, Inc., Seattle, WA (US)

(72) Inventors: Xue Jun Wu, Seattle, WA (US); Songqian Chen, Seattle, WA (US); Olga Kazakova, Lake Forest Park, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,051

(22) Filed: Oct. 29, 2018

Related U.S. Application Data

(63) Continuation of application No. 15/984,197, filed on May 18, 2018, now Pat. No. 10,116,679.

(51) Int. Cl.
| | | |
|---|---|---|
| H04L 29/06 | (2006.01) | |
| H04L 12/26 | (2006.01) | |
| G06F 16/245 | (2019.01) | |

(52) U.S. Cl.
CPC ........ *H04L 63/1425* (2013.01); *G06F 16/245* (2019.01); *H04L 43/062* (2013.01); *H04L 63/102* (2013.01); *H04L 63/105* (2013.01)

(58) Field of Classification Search
CPC .............. H04L 63/145; H04L 63/1425; H04L 43/0823; H04L 67/1044; H04L 41/065; H04L 69/16
See application file for complete search history.

(56) References Cited

U.S. PATENT DOCUMENTS

| | | | |
|---|---|---|---|
| 5,027,269 | A | 6/1991 | Grant |
| 5,430,727 | A | 7/1995 | Callon |
| 5,541,995 | A | 7/1996 | Normile et al. |
| 5,715,464 | A | 2/1998 | Crump et al. |
| 5,787,237 | A | 7/1998 | Reilly |

(Continued)

OTHER PUBLICATIONS

Official Communication for U.S. Appl. No. 16/113,442 dated Nov. 6, 2018, pp. 1-41.

(Continued)

*Primary Examiner* — Amir Mehrmanesh
(74) *Attorney, Agent, or Firm* — John W. Branch; Lowe Graham Jones PLLC

(57) ABSTRACT

Embodiments are directed to monitoring network traffic. A monitoring engine may monitor network traffic associated with entities in one or more networks. A device relation model may be provided based on the entities and the network traffic. An inference engine associate the entities with privilege levels based on the device relation model based on an amount of access or an amount of control that source entities exert over the target entities. An anomaly engine may determine one or more interactions between the source entities and the target entities based on the monitored network traffic. The anomaly engine may generate escalation events based on the interactions associated with the source entities and the target entities where the target entities have a higher privilege level than the source entities. The anomaly engine may provide the escalation events to one or more users.

20 Claims, 18 Drawing Sheets

(56) References Cited

U.S. PATENT DOCUMENTS

| | | |
|---|---|---|
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,474,654 B2 | 1/2009 | Guru |
| 7,480,292 B2 | 1/2009 | Busi et al. |
| 7,535,906 B2 | 5/2009 | Engbersen et al. |
| 7,545,499 B2 | 6/2009 | Overbeck et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,774,456 B1 | 8/2010 | Lownsbrough et al. |
| 7,864,764 B1 | 1/2011 | Ma et al. |
| 7,916,652 B1 | 3/2011 | Lima et al. |
| 7,979,555 B2 | 7/2011 | Rothstein et al. |
| 8,040,798 B2 | 10/2011 | Chandra et al. |
| 8,079,083 B1 | 12/2011 | Bennett et al. |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 9,191,400 B1 | 11/2015 | Ptasinski et al. |
| 9,391,866 B1 | 7/2016 | Martin et al. |
| 9,426,036 B1 | 8/2016 | Roy |
| 9,516,053 B1 | 12/2016 | Muddu et al. |
| 9,692,658 B2 | 6/2017 | Guo et al. |
| 9,715,820 B1 | 7/2017 | Boss et al. |
| 10,027,689 B1 | 7/2018 | Rathor et al. |
| 10,038,611 B1 | 7/2018 | Wu et al. |
| 10,063,434 B1 | 8/2018 | Khanal et al. |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0107953 A1 | 8/2002 | Ontiveros et al. |
| 2002/0133586 A1 | 9/2002 | Shanklin et al. |
| 2002/0152209 A1 | 10/2002 | Merugu et al. |
| 2002/0156880 A1 | 10/2002 | Mokuya |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0233361 A1 | 12/2003 | Cady |
| 2004/0003094 A1 | 1/2004 | See |
| 2004/0047325 A1 | 3/2004 | Hameleers et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0182833 A1 | 8/2005 | Duffie et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0085526 A1 | 4/2006 | Gulland |
| 2006/0106743 A1 | 5/2006 | Horvitz et al. |
| 2006/0123477 A1 | 6/2006 | Raghavan et al. |
| 2006/0174343 A1 | 8/2006 | Duthie et al. |
| 2006/0184535 A1 | 8/2006 | Kaluskar et al. |
| 2006/0230456 A1 | 10/2006 | Nagabhushan et al. |
| 2007/0039051 A1 | 2/2007 | Duthie et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0192863 A1 | 8/2007 | Kapoor et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0147818 A1 | 6/2008 | Sabo |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0168657 A1 | 7/2009 | Puri et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0292954 A1 | 11/2009 | Jiang et al. |
| 2009/0296593 A1 | 12/2009 | Prescott |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0250928 A1 | 9/2010 | Goto |

(56) References Cited

U.S. PATENT DOCUMENTS

| | | |
|---|---|---|
| 2010/0299158 A1 | 11/2010 | Siegel |
| 2010/0316216 A1 | 12/2010 | Fukushima et al. |
| 2010/0322248 A1 | 12/2010 | Ivanov |
| 2011/0019574 A1 | 1/2011 | Malomsoky et al. |
| 2011/0073490 A1 | 3/2011 | Hayamizu et al. |
| 2011/0173441 A1 | 7/2011 | Bagepalli et al. |
| 2011/0280149 A1 | 11/2011 | Okada et al. |
| 2011/0320394 A1 | 12/2011 | McKeown et al. |
| 2012/0130745 A1 | 5/2012 | Jones |
| 2012/0166962 A1 | 6/2012 | Lunsford |
| 2012/0176917 A1 | 7/2012 | Matityahu et al. |
| 2012/0215328 A1 | 8/2012 | Schmelzer |
| 2012/0233694 A1 | 9/2012 | Baliga et al. |
| 2012/0243533 A1 | 9/2012 | Leong |
| 2012/0294305 A1 | 11/2012 | Rose et al. |
| 2013/0010608 A1 | 1/2013 | Ramachandran et al. |
| 2013/0042323 A1 | 2/2013 | Narayanaswamy |
| 2013/0061036 A1 | 3/2013 | Oliver |
| 2013/0064084 A1 | 3/2013 | Babbar et al. |
| 2013/0103734 A1 | 4/2013 | Boldyrev et al. |
| 2013/0166730 A1 | 6/2013 | Wilkinson |
| 2013/0176842 A1 | 7/2013 | Bauchot et al. |
| 2013/0232104 A1 | 9/2013 | Goyal et al. |
| 2013/0305357 A1 | 11/2013 | Ayyagari et al. |
| 2014/0040451 A1 | 2/2014 | Agrawal et al. |
| 2014/0077956 A1 | 3/2014 | Sampath et al. |
| 2014/0142972 A1 | 5/2014 | Hosenfeld, Jr. |
| 2014/0164584 A1 | 6/2014 | Joe et al. |
| 2014/0165207 A1 | 6/2014 | Engel et al. |
| 2014/0222998 A1 | 8/2014 | Vasseur et al. |
| 2014/0223325 A1 | 8/2014 | Melendez et al. |
| 2014/0304211 A1 | 10/2014 | Horvitz |
| 2015/0007314 A1 | 1/2015 | Vaughan |
| 2015/0134554 A1 | 5/2015 | Clais et al. |
| 2015/0199613 A1 | 7/2015 | Ruiz et al. |
| 2015/0229661 A1 | 8/2015 | Balabine et al. |
| 2015/0249512 A1 | 9/2015 | Adimatyam et al. |
| 2015/0331771 A1 | 11/2015 | Conway |
| 2015/0341379 A1 | 11/2015 | Lefebvre et al. |
| 2016/0028755 A1 | 1/2016 | Vasseur et al. |
| 2016/0036647 A1 | 2/2016 | Gonzalez et al. |
| 2016/0055335 A1 | 2/2016 | Herwono et al. |
| 2016/0182274 A1 | 6/2016 | Kiesekamp et al. |
| 2016/0219066 A1 | 7/2016 | Vasseur et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2017/0126709 A1 | 5/2017 | Baradaran et al. |
| 2017/0279838 A1 | 9/2017 | Dasgupta et al. |
| 2017/0288974 A1 | 10/2017 | Yoshihira et al. |
| 2017/0310703 A1 | 10/2017 | Ackerman et al. |
| 2018/0084011 A1 | 3/2018 | Joseph et al. |
| 2018/0109507 A1 | 4/2018 | Caldera et al. |
| 2018/0109557 A1 | 4/2018 | Yoo et al. |
| 2018/0191755 A1 | 7/2018 | Monaco et al. |
| 2018/0198812 A1 | 7/2018 | Christodorescu et al. |
| 2018/0219879 A1 | 8/2018 | Pierce |

OTHER PUBLICATIONS

Official Communication for U.S. Appl. No. 16/107,509 dated Oct. 26, 2018, pp. 1-26.
Official Communication for U.S. Appl. No. 15/014,932 dated Nov. 23, 2018, pp. 1-22.
Official Communication for U.S. Appl. No. 16/100,116 dated Nov. 15, 2018, pp. 1-44.
Office Communication for U.S. Appl. No. 15/891,273 dated Jan. 15, 2019, pp. 1-46.
Official Communication for U.S. Appl. No. 12/326,672 dated Jun. 9, 2010, pp. 1-9.
Official Communication for U.S. Appl. No. 12/326,672 dated Dec. 23, 2010, pp. 1-15.
Official Communication for U.S. Appl. No. 12/326,672 dated Jun. 22, 2011, pp. 1-16.
Official Communication for U.S. Appl. No. 12/326,672 dated Oct. 24, 2011, pp. 1-9.
Lin, Mark, "An Overview of Session Hijacking at the Network and Application Levels," Jan. 18, 2005, pp. 1-16.
U.S. Appl. No. 11/683,643, entitled "Detecting Anomalous Network Application Behavior", by Jesse Abraham Rothstein and Arindum Mukerji, filed Mar. 8, 2007, pp. 1-40.
U.S. Appl. No. 11/679,356, entitled "Capture and Resumption of Network Application Sessions", by Jesse Abraham Rothstein and Arindum Mukerji, filed Feb. 27, 2007, pp. 1-37.
Official Communication for U.S. Appl. No. 11/683,643 dated Apr. 28, 2010, pp. 1-35.
Official Communication for U.S. Appl. No. 11/683,643 dated Oct. 14, 2010, pp. 1-43.
Official Communication for U.S. Appl. No. 11/683,643 dated Aug. 25, 2011, pp. 1-43.
Official Communication for U.S. Appl. No. 11/683,643 dated Jan. 23, 2012, pp. 1-6.
Official Communication for U.S. Appl. No. 13/831,626, dated Sep. 3, 2013, pp. 1-17.
Official Communication for U.S. Appl. No. 13/831,673 dated Sep. 30, 2013, pp. 1-10.
Official Communication for U.S. Appl. No. 13/831,673 dated Mar. 6, 2014, pp. 1-12.
Official Communication for U.S. Appl. No. 13/831,673 dated May 22, 2014, pp. 1-5.
Official Communication for U.S. Appl. No. 14/518,996 dated Nov. 20, 2014, pp. 1-41.
Official Communication for U.S. Appl. No. 13/831,908 dated Jun. 25, 2014, pp. 1-15.
Official Communication for U.S. Appl. No. 14/500,893 dated Nov. 20, 2014, pp. 1-15.
Official Communication for U.S. Appl. No. 13/831,908 dated Apr. 9, 2014, pp. 1-3.
Official Communication for U.S. Appl. No. 13/831,908 dated Aug. 9, 2013, pp. 1-29.
Official Communication for U.S. Appl. No. 13/831,908 dated Jan. 13, 2014, pp. 1-31.
Official Communication for U.S. Appl. No. 14/107,631 dated Dec. 30, 2014, pp. 1-12.
Handel et al. "Hiding Data in the OSI Network Model," Los Alamos, New Mexico, 1996, pp. 1-16.
Official Communication for U.S. Appl. No. 14/107,631 dated Feb. 20, 2014, pp. 1-16.
Official Communication for U.S. Appl. No. 14/107,631 dated Sep. 26, 2014, pp. 1-14.
Handley et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, "Evaluation of OSPF Extensions in MANET Routing," Paris, 2007, pp. 1-192.
Parsons, "Moving Across the Internet: Code-Bodies, Code-Corpses, and Network Architecture," May 9, 2010, pp. 1-20.
Zander et al., "Covert Channels and Countermeasures in Computer Network Protocols," Dec. 2007, pp. 1-7.
Official Communication for U.S. Appl. No. 14/500,893 dated Feb. 18, 2015, pp. 1-11.
Official Communication for U.S. Appl. No. 14/107,580 dated Mar. 6, 2014, pp. 1-13.
Official Communication for U.S. Appl. No. 14/107,580 dated Sep. 15, 2014, pp. 1-15.
Official Communication for U.S. Appl. No. 14/107,580 dated Mar. 17, 2015, pp. 1-5.
Official Communication for U.S. Appl. No. 11/679,356 dated Jun. 22, 2009, pp. 1-21.
Official Communication for U.S. Appl. No. 11/679,356 dated Dec. 11, 2009, pp. 1-23.
Official Communication for U.S. Appl. No. 11/679,356 dated Feb. 22, 2010, pp. 1-3.
Official Communication for U.S. Appl. No. 11/679,356 dated Sep. 9, 2010, pp. 1-16.

(56) References Cited

OTHER PUBLICATIONS

Official Communication for U.S. Appl. No. 11/679,356 dated Mar. 4, 2011, pp. 1-15.

Official Communication for U.S. Appl. No. 15/014,932 dated Jun. 10, 2016, pp. 1-20.

Official Communication for U.S. Appl. No. 15/014,932 dated Dec. 14, 2016, pp. 1-26.

Digital Imaging and Communications in Medicine (DICOM), Part 6: Data Dictionary, PS 3.6-2011. 2011, http://dicom.nema.org/Dicom/2011/11_06pu.pdf, pp. 1-255.

Health Level Seven, Version 2.6, Appendix A. Nov. 2007, https://www.hl7.org/special/committees/vocab/V26_Appendix_A.pdf, p. 1-216.

Official Communication for U.S. Appl. No. 15/207,213 dated Jun. 1, 2017, pp. 1-24.

Official Communication for U.S. Appl. No. 15/207,213 dated May 8, 2017, pp. 1-5.

Official Communication for U.S. Appl. No. 15/207,213 dated Feb. 23, 2017, pp. 1-24.

Official Communication for U.S. Appl. No. 15/207,213 dated Oct. 25, 2016, pp. 1-18.

Official Communication for U.S. Appl. No. 15/014,932 dated Aug. 1, 2017, pp. 1-27.

Official Communication for U.S. Appl. No. 15/690,135 dated Jan. 18, 2018, pp. 1-6.

Office Communication for U.S. Appl. No. 15/892,327 dated Apr. 23, 2018, pp. 1-35.

Office Communication for U.S. Appl. No. 15/014,932 dated May 15, 2018, pp. 1-27.

Office Communication for U.S. Appl. No. 15/891,273 dated Jun. 19, 2018, pp. 1-23.

Office Communication for U.S. Appl. No. 15/014,932 dated Jul. 16, 2018, pp. 1-16.

Office Communication for U.S. Appl. No. 15/690,135 dated May 22, 2018, pp. 1-7.

Office Communication for U.S. Appl. No. 15/984,197 dated Aug. 31, 2018, pp. 1-60.

Official Communication for U.S. Appl. No. 16/048,939 dated Sep. 19, 2018, pp. 1-36.

Official Communication for U.S. Appl. No. 15/891,311 dated Sep. 24, 2018, pp. 1-16.

Official Communication for U.S. Appl. No. 16/112,442 dated Nov. 6, 2018, pp. 1-44.

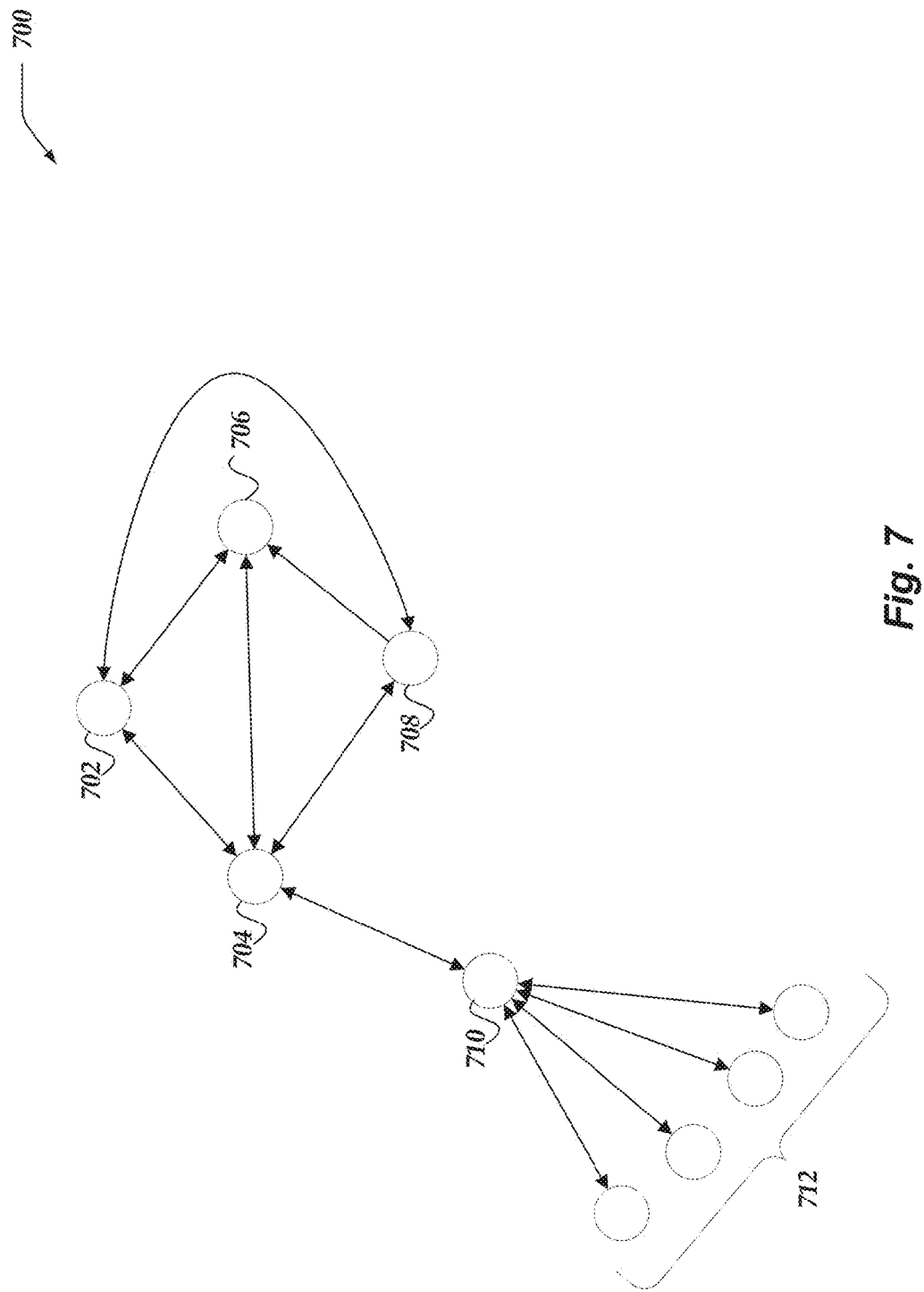

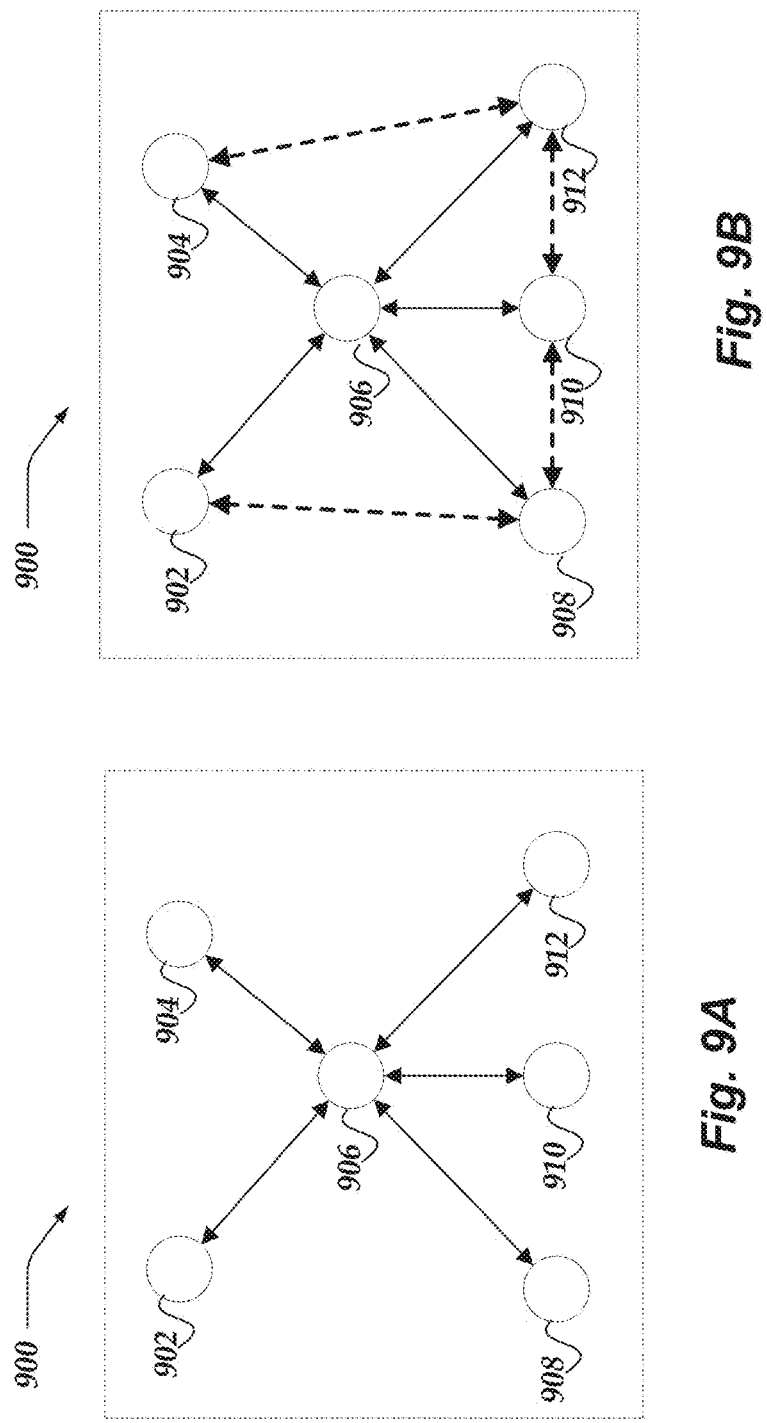

US 10,277,618 B1

PRIVILEGE INFERENCE AND MONITORING BASED ON NETWORK BEHAVIOR

CROSS-REFERENCE TO RELATED APPLICATION(S)

This Utility Patent Application is a Continuation of U.S. patent application Ser. No. 15/984,197 filed on May 18, 2018, now U.S. Pat. No. 10,116,679 issued on Oct. 30, 2018, the benefit of which is claimed under 35 U.S.C. § 120, and the contents of which is further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In some cases, different users or devices on a network may be granted different privileges. In large scale networks many users or devices may be added or removed. Accordingly, it may be challenging to ensure that the privileges associated with users or devices are consistent or appropriate. Also, in some environments, users or devices may be assigned privileges levels that allow access that may be inconsistent with the roles of the users or the purposes of the devices. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 7 illustrates a logical representation of a portion of device relation model in accordance with at least one of the various embodiments;

FIG. 9A illustrates a logical representation of a device relation model showing relationships between the entities based on observed network connections in accordance with the one or more embodiments;

FIG. 9B illustrates a logical representation of a device relation model showing phantom edges that represent relationships between the entities in accordance with the one or more embodiments;

DETAILED DESCRIPTION OF VARIOUS EMBODIMENTS

Figure 1:
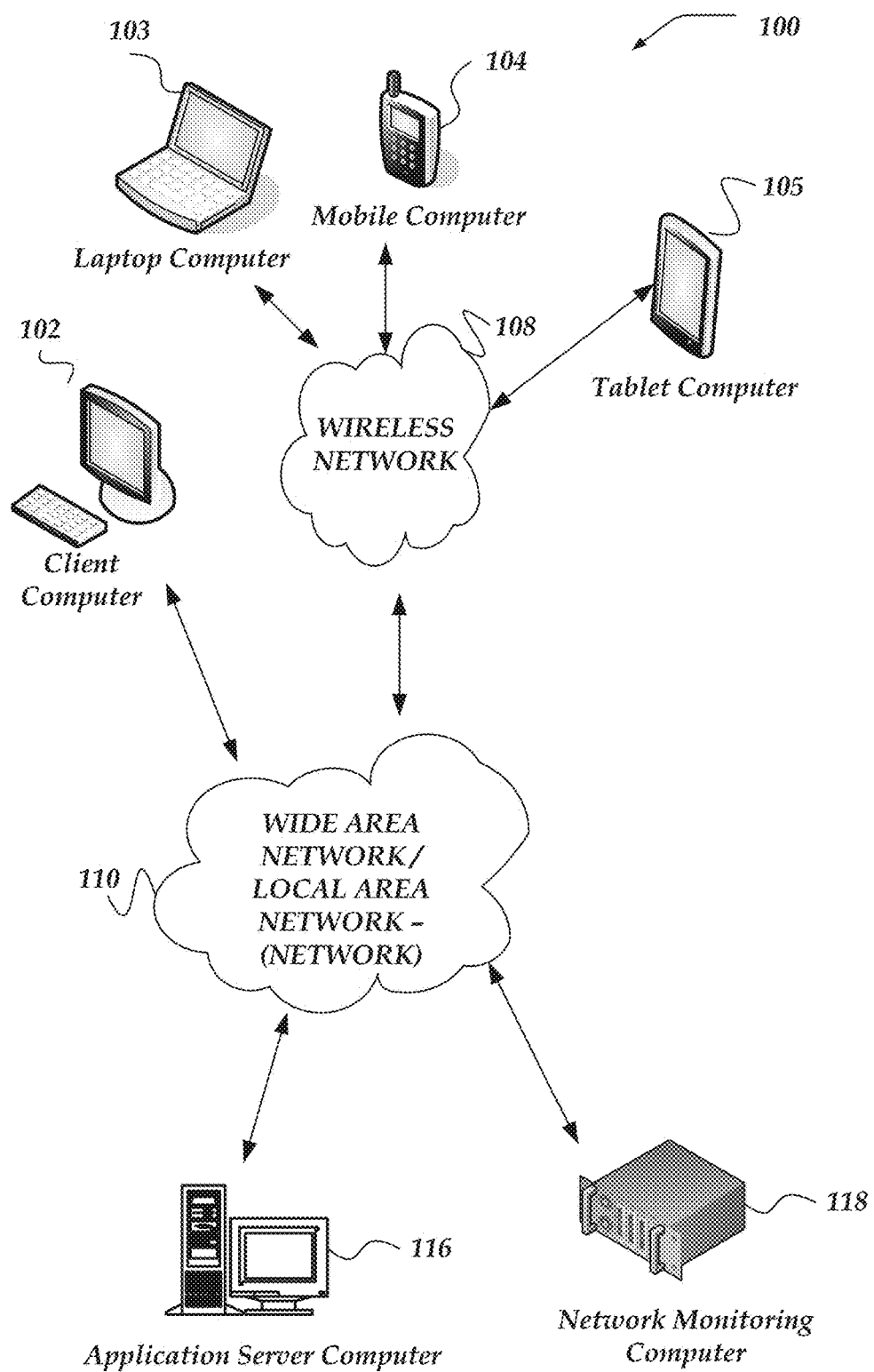
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In one or more of the various embodiments, NMCs or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model.

The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, or the like, operating in the monitored network. For example, individual entities may include, web clients, web servers, database clients, database servers, mobile app clients, payment processors, groupware clients, groupware services, or the like. In some cases, multiple entities may co-exist on the same network computer, process, application, or cloud compute instance.

As used herein, the term "device relation model" refers to a data structure that is used to represent relationships between and among different entities in a monitored network. Device relation models may be graph models comprised of nodes and edges stored in the memory of a network computer. In some embodiments, the network computer may automatically update the configuration and composition of the device relation model stored in the memory of the network computer to reflect the relationships between two or more entities in the monitored network. Nodes of the graph model may represent entities in the network and the edges of the graph model represent the relationship between entities in the network. Device relation models may improve the performance of computers at least by enabling a compact representation of entities and relationships in large networks to reduce memory requirements.

As used herein, the "device profile" refers to a data structure that represents the characteristics of network devices or entities that are discovered in networks monitored by NMCs. Values or fields in device profiles may be based on metrics, network traffic characteristics, network footprints, or the like, that have been collected based on passive network monitoring of network traffic in one or more monitored networks. Device profiles may be provided for various network devices, such as, client computers, server computers, application server computers, networked storage devices, routers, switches, firewalls, virtual machines, cloud instances, or the like.

As used herein, the "application profile" refers to a data structure that represents the characteristics of applications or services that are discovered in networks monitored by NMCs. Values or fields in application profiles may be based on metrics, network traffic characteristics, network footprints, or the like, that have been collected based on passive network monitoring of network traffic in one or more monitored networks. Application profiles may be provided for various applications, such as, client computers, server computers, application server computers, networked storage devices, routers, switches, firewalls, virtual machines, cloud instances, or the like. For example, application profiles may be provided for web clients, web servers, database clients, database servers, credentialing services, mobile application clients, payment processors, groupware clients, groupware services, micro-services, container based services, document management clients, document management services, billing/invoicing systems, building management services, healthcare management services, VOIP clients, VOIP servers, or the like.

As used herein, the term "entity profile" refers to a data structure that represent the characteristics of a network entity that may be a combination of device profiles and application profiles. Entity profiles may also include additional values or fields based on metrics, network traffic characteristics, network footprint, or the like, that have been collected based on passive network monitoring of network traffic in one or more monitored networks. For example, an entity profile may be provided for application servers where the entity profile is made from some or all of the device profile of the computer running or hosting the applications and some or all of the application profiles associated with the applications or services that are running or hosting one the computer. In some cases, multiple services or applications running on devices may be included in the same entity profile. In other cases, entity profiles may be arranged in hierarchal data structure similar to an object oriented computer languages class hierarchy.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic using one or more network computers. In one or more of the various embodiments, a monitoring engine may be instantiated to perform various actions. In one or more of the various embodiments, the monitoring engine may be arranged to monitor network traffic that may be associated with a plurality of entities in one or more networks to provide one or more metrics such that the entities include one or more of a source entity and one or more of a target entity.

In one or more of the various embodiments, the monitoring engine may be arranged to provide a device relation model based on the plurality of entities, the network traffic or the one or more metrics. In one or more of the various embodiments, the monitoring engine may be arranged to modify the device relation model based on one or more additions or removals of the plurality of entities in the network. And, in some embodiments, modify the one or more privilege levels associated with the plurality of entities based on the one or more modifications to the device relation model.

In one or more of the various embodiments, the monitoring engine may be arranged to determine one or more network topology characteristics based on the monitored network traffic. And, in some embodiments, the monitoring engine may associate one or more default privilege levels with the plurality of entities based on the one or more network topology characteristics.

In one or more of the various embodiments, an inference engine may be instantiated to associate the plurality of entities with one or more privilege levels based on the device relation model or the one or more metrics such that a value for each of the one or more privilege levels may be based on one or more of an amount of access or an amount of control that the one or more source entities exert over the one or more target entities.

In one or more of the various embodiments, the inference engine may be arranged to modify each privilege level associated with each entity based on one or more characteristics including one or more of resources accessed by an entity, resources provided by the entity, users that access the entity, users that are logged into the entity, an uptime of the entity, privilege levels of connected entities, privilege levels of related entities, privilege levels of the logged in users, number of clients, additional metadata, or the like.

In one or more of the various embodiments, the inference engine may be arranged to increase the one or more privilege levels for a source entity based on one or more metric values that are associated with the one or more target entities that are linked to the source entity.

In one or more of the various embodiments, the inference engine may be arranged to associate the plurality of entities with metadata that includes one or more of user identities, user types, read/write accessibility, application types, direction of relation, age of relation, frequency of activity, or the like. And, in some embodiments, modify the one or more privilege levels based on the metadata.

In one or more of the various embodiments, an anomaly engine may be instantiated to determine one or more interactions between the one or more source entities and the one or more target entities based on the monitored network traffic.

In one or more of the various embodiments, the anomaly engine may be arranged to generate one or more escalation events based on the one or more interactions and the one or more privilege levels associated with the one or more source entities and the one or more target entities such that the one or more target entities have a privilege level that exceeds the one or more privilege levels of the one or more source entities.

In one or more of the various embodiments, the anomaly engine may be arranged to provide the one or more escalation events to one or more users. In one or more of the various embodiments, the anomaly engine may be arranged to determining one or more application protocols that may be associated with the one or more interactions based on the monitored network traffic. And, in some embodiments, the anomaly engine may determine a privilege level that may be associated with each of the one or more interactions that are associated with the one or more determined application protocols.

In one or more of the various embodiments, the anomaly engine may be arranged to query one or more databases to obtain information about the one or more interactions such that the one or more databases are separate from the anomaly engine and a network monitoring computer. And, in some embodiments, the anomaly engine may be arranged to further determine the one or more escalation events based on the obtained information.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks.

Accordingly, these innovations and embodiments are not to be construed as being limited to a single environment, and other configurations, and other architectures are also envisaged.

Illustrative Client Computer

Figure 2:
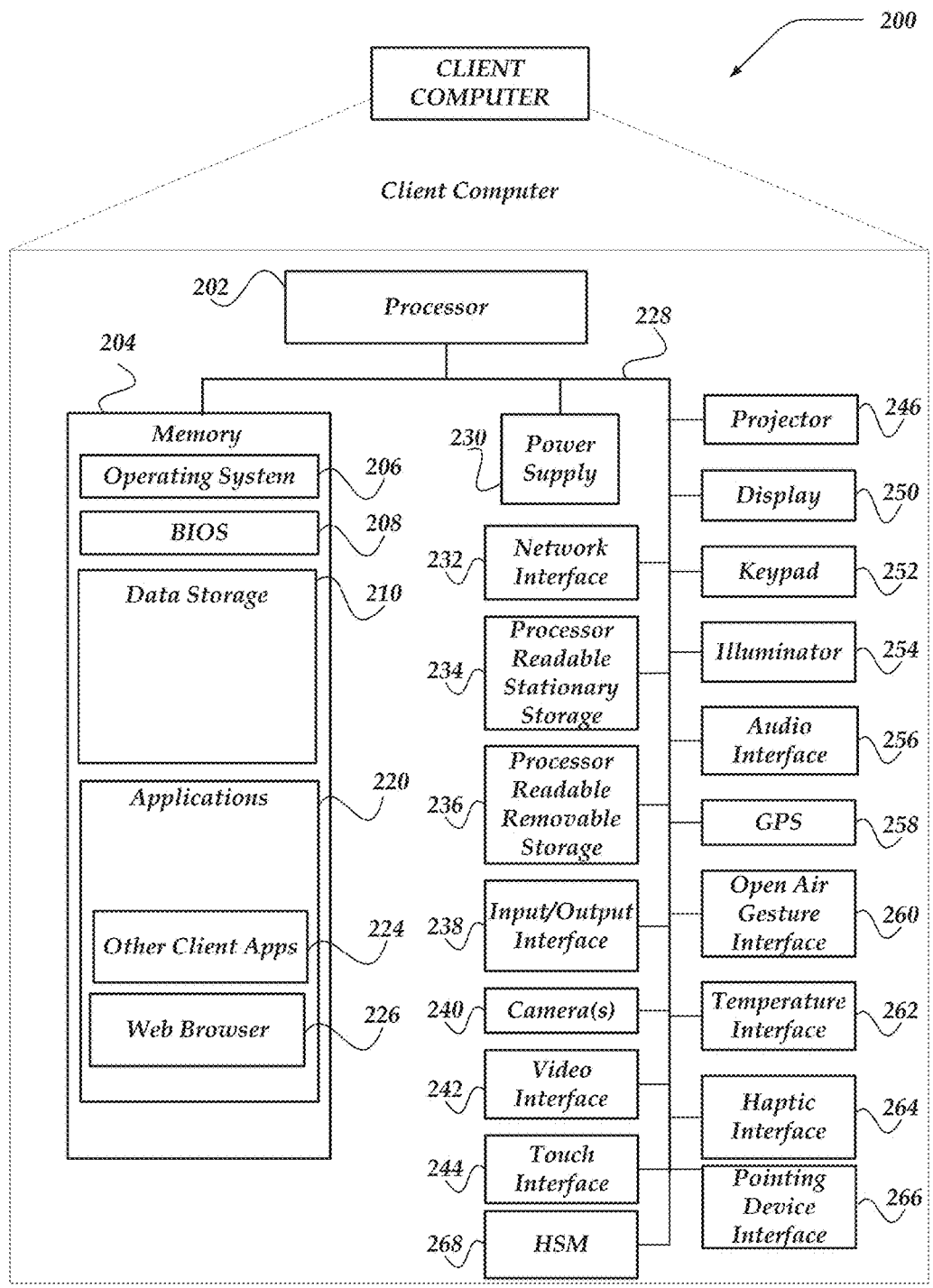
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
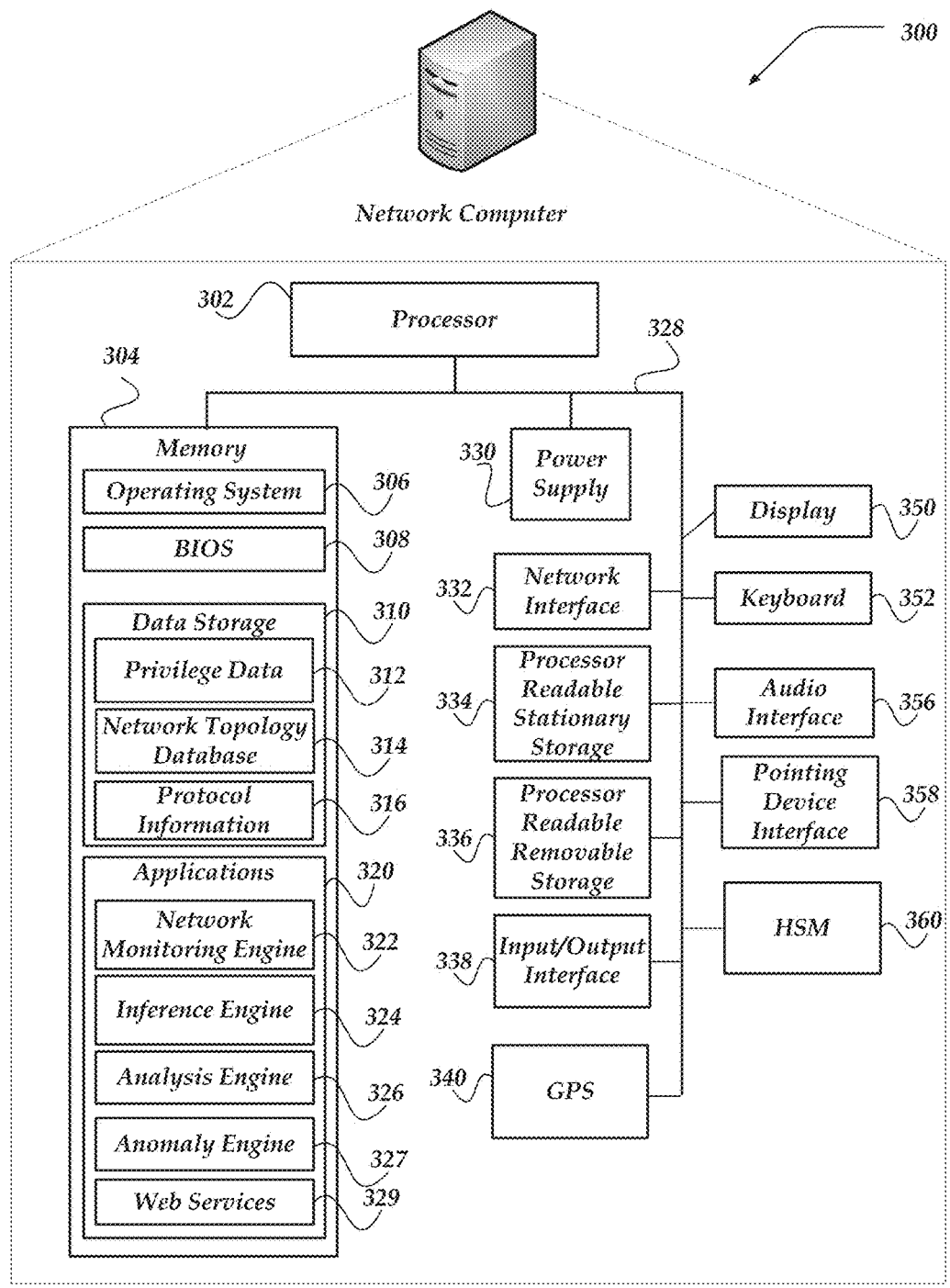
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, inference engine 324, analysis engine 326, alert engine 327, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, privilege database 312, network topology database 314, protocol information 316, or the like. Privilege database 312 may be a database arranged for privilege level information for entities in monitored networks. Network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, inference engine 324, analysis engine 326, anomaly engine 327, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, inference engine 324, analysis engine 326, anomaly engine 327, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, inference engine 324, analysis engine 326, anomaly engine 327, web services 329, or the like, may be provisioned and de-commissioned automatically.

Also, in one or more of the various embodiments, network monitoring engine 322, inference engine 324, analysis engine 326, anomaly engine 327, web services 329, or the like, may be located in virtual servers running in a cloud-based computing environment rather than being tied to one or more specific physical network computers. Likewise, in some embodiments, one or more of network monitoring engine 322, inference engine 324, analysis engine 326, anomaly engine 327, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
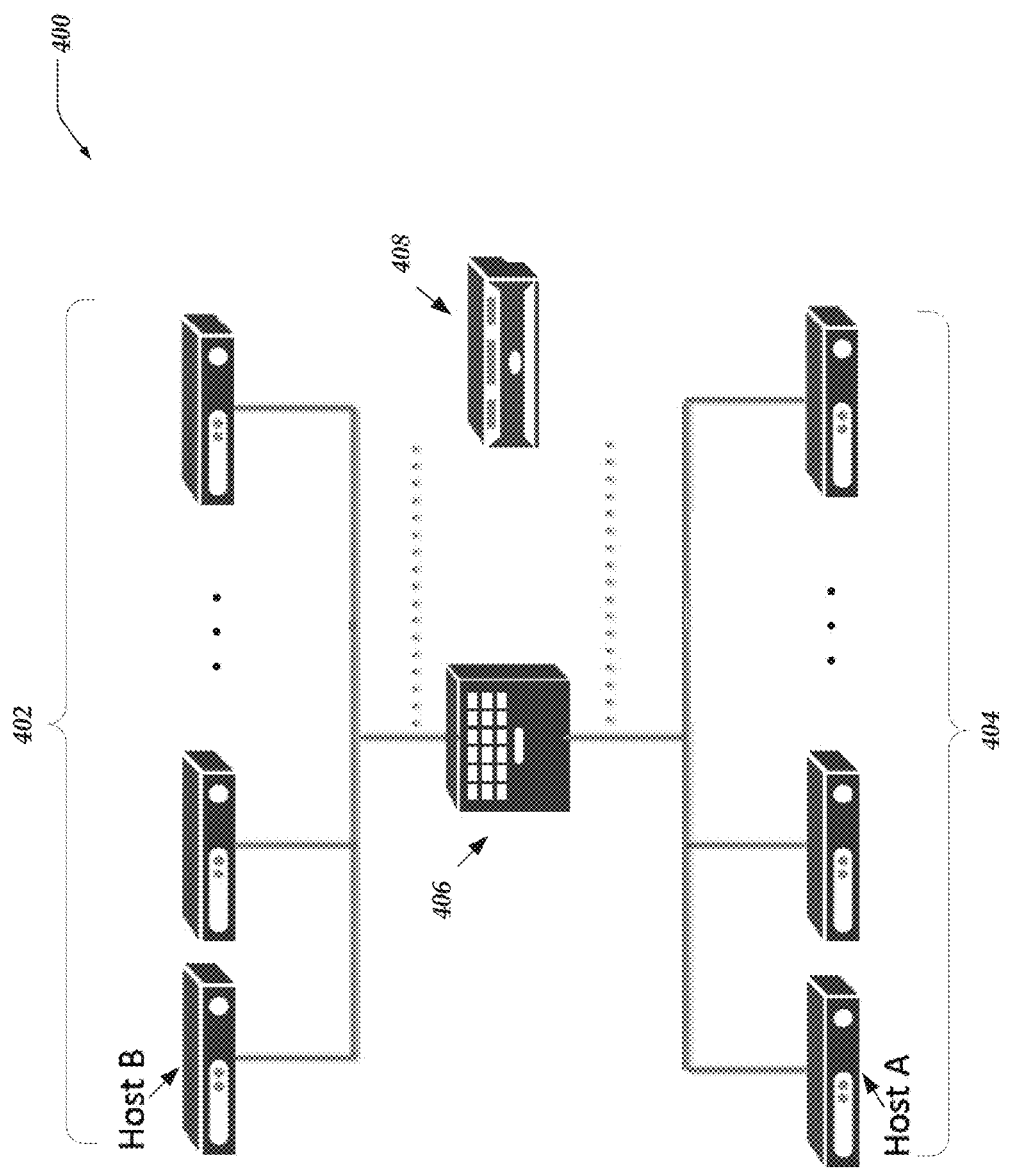
FIG. 4 illustrates a logical architecture of a system for privilege inference and monitoring based on network behavior in accordance with one or more of the various embodiments.

FIG. 4 illustrates a logical architecture of system 400 for privilege inference and monitoring based on network behavior in accordance with one or more of the various embodiments. System 400 may be arranged to include a plurality of network devices or network computers on first network 402 and a plurality of network devices or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs may be arranged to employ adaptive networking monitoring information including one or more device relation models to that enable inference engines, analysis engine to determine privilege levels for entities in the monitored networks. Also, in some embodiments, NMCs may be arranged to instantiate one or more network monitoring engines, one or more anomaly engines, or the like, to identify or classify privilege escalation or associated activities.

Figure 5:
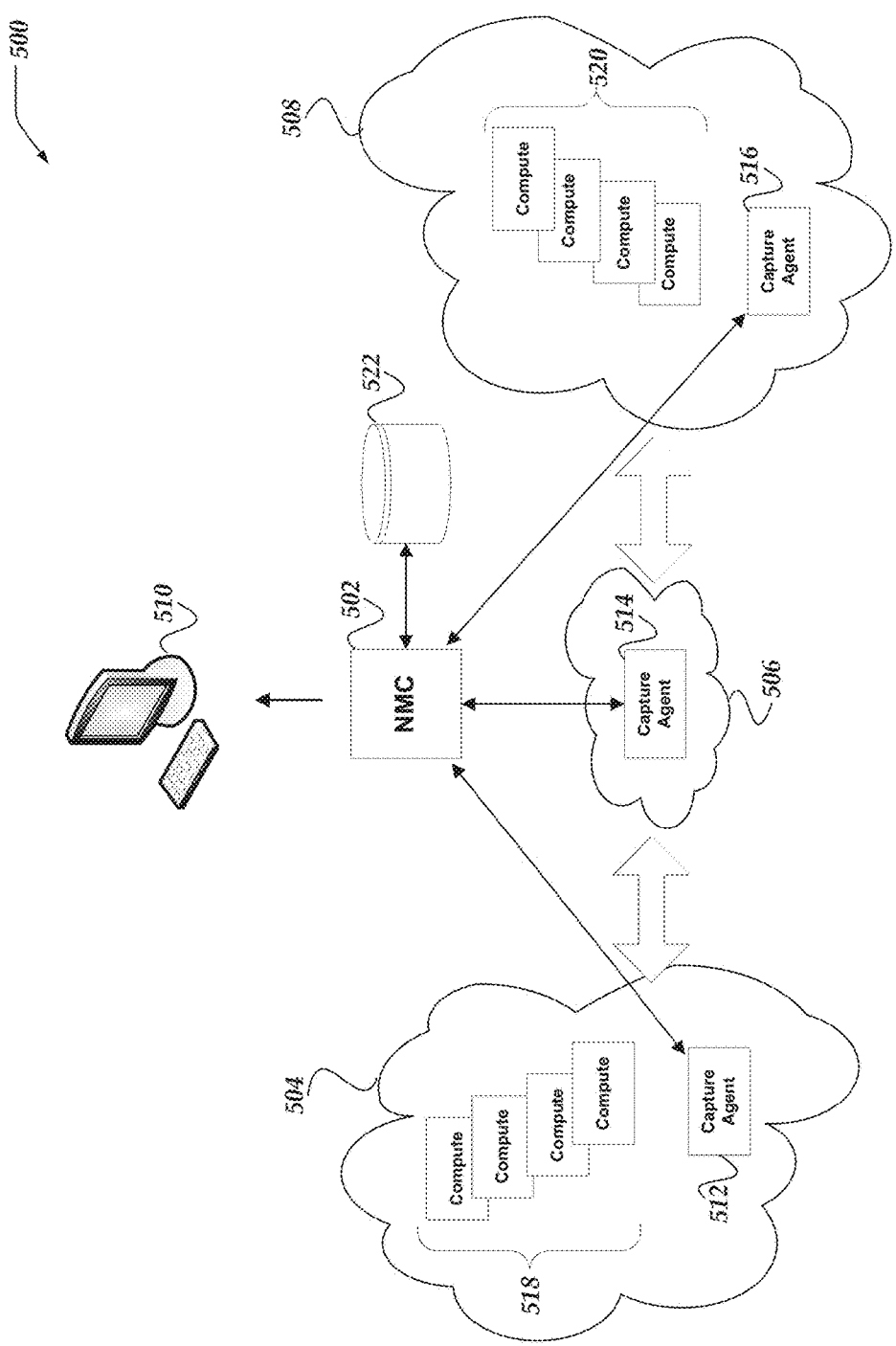
FIG. 5 illustrates a logical schematic of a system for privilege inference and monitoring based on network behavior in accordance with one or more of the various embodiments.

FIG. 5 illustrates a logical schematic of system 500 for privilege inference and monitoring based on network behavior in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, applications, services, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a capture data store, such as, capture data store 522.

Figure 6:
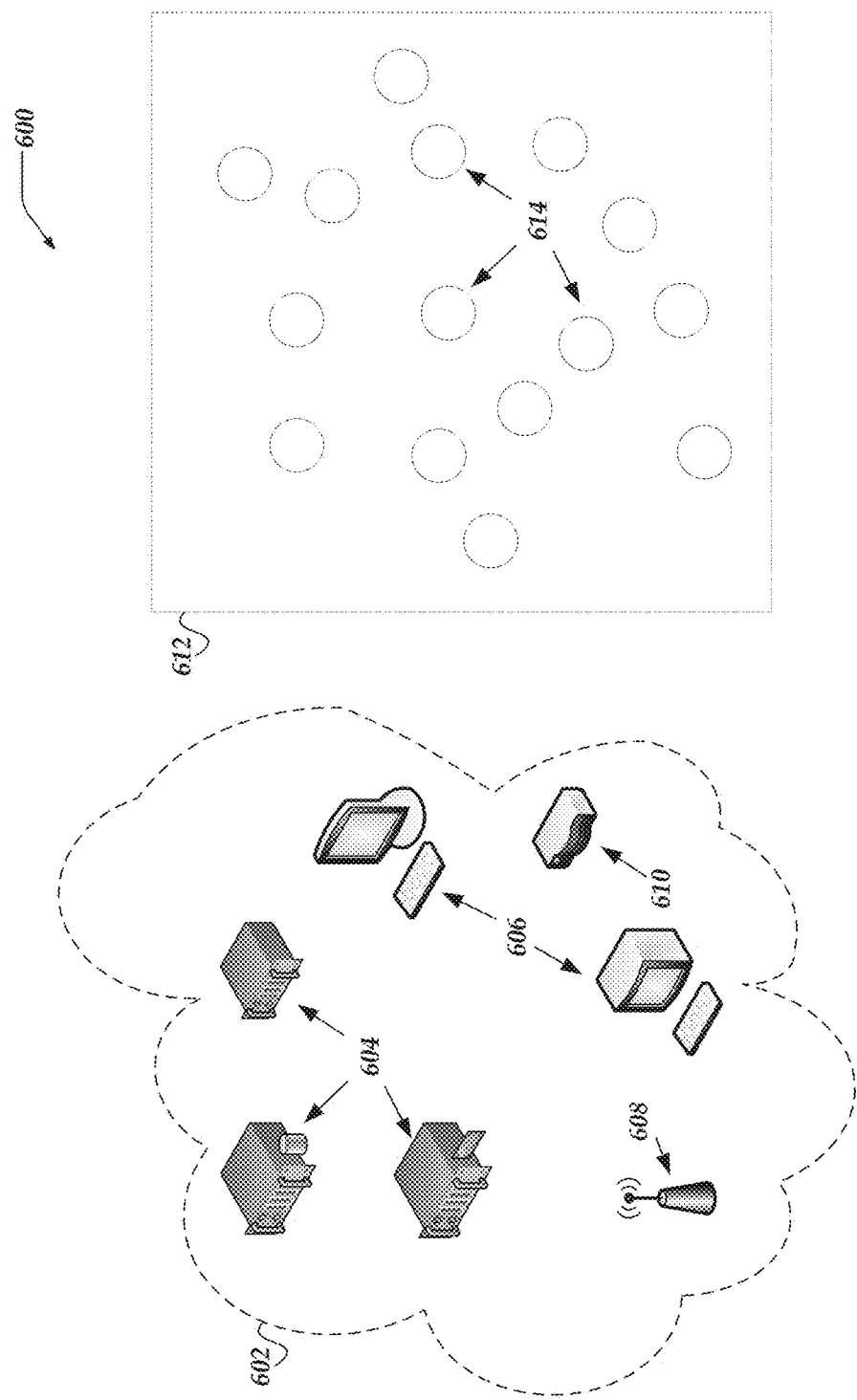
FIG. 6 illustrates a logical representation of a network in accordance with at least one of the various embodiments.

FIG. 6 illustrates a logical representation of network 600 in accordance with at least one of the various embodiments. In at least one of the various embodiments, network 602 represents a physical network and the entities in the network. In this example, network 602 includes, network computers 604, client computers 606, network devices, such as, network device 610, and other items, such as, WI-FI hotspot 608. One of ordinary skill in the art will appreciate that networks may have many more or different devices than shown in FIG. 6.

In at least one of the various embodiments, one or more network monitoring computers (NMCs) may be arranged to monitor networks, such as, network 602. (See, FIG. 4). In at least one of the various embodiments, NMCs may be arranged to generate one or more device relation models that represent the entities in a network. For example, device relation model 612 represents a device relation model corresponding to network 602. Accordingly, device relation model 612 includes nodes that represent the various entities that may be active in network 602. For example, entities 614, may represent some of the entities that are operative in network 602. In some embodiments, there may be more entities in model 612 than the number of actual computers and network devices present in network 602 since many network computers/devices may host more than one entity. For example, in some embodiments, a single network computer may host a web server and a database server. Accordingly, in this example, three entities may be included in the device relation model, one for the web server, one for the database server, and one for the network computer itself.

In this example, device relation model 612 shows nodes that corresponds to entities absent any edges. In some embodiments, initially some or all of the relationships between the entities may be unknown to the monitoring NMC, so some or all of the edges may be unknown and therefor omitted from device relation model 612. Note, in at least one of the various embodiments, there may be pre-defined network architecture/topology information that may be available to the NMC. Accordingly, in some embodiments, the NMC may be able to determine some of the relationships between entities before observing network traffic.

FIG. 7 illustrates a logical representation of a portion of device relation model 700 in accordance with at least one of the various embodiments. In at least one of the various embodiments, device relation models may include nodes that represent entities and edges that represent relationships between the entities. In some embodiments, entities may represent servers, clients, switches, routers, NMCs, load balancers, applications, services, or the like. For example, entity 702 may be a server entity that has relationships with other servers, such as, entity 704 and entity 706. Likewise, entity 708 may be a server or other service that has a relationship with entity 704, entity 706, and entity 702. Further, entity 704 and entity 710 may have a relationship and client entities 712 may have direct relationships with entity 710.

In at least one of the various embodiments, NMCs may be arranged to use device relation model 700 to discover relationships between groups of entities. For example, device relation model 700 may be used to determine that entity 702, entity 704, 710, and client 712 may be in a related group because they are all on the same path through the graph.

In one or more of the various embodiments, one or more device relation models may be generated to represent different dimensions or concepts that may relate the one or more entities included in a model. For example, one device relation model may represent general dependencies among entities while another device relation model may be arranged to represent administration dependencies that show which entities may be arranged to administrator other entities.

Figure 8B:
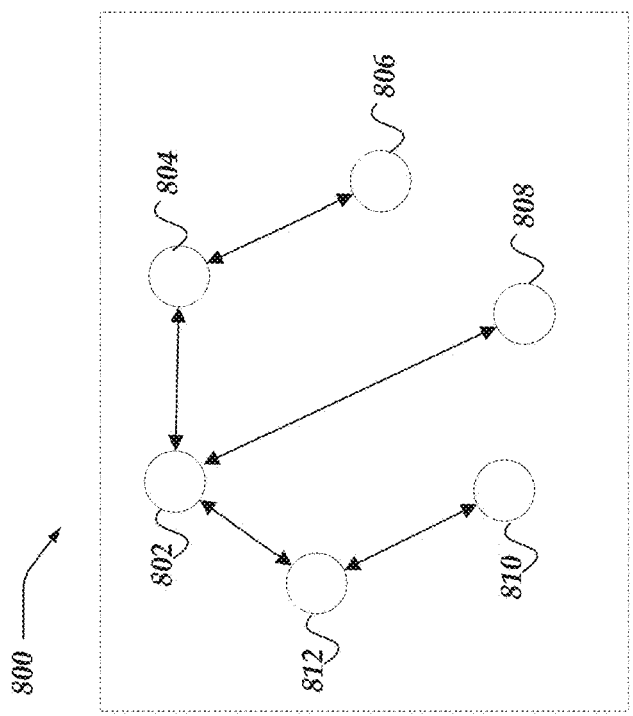
FIG. 8B illustrates a logical representation of a device relation model showing informed relationships between the entities in accordance with the one or more embodiments.
Figure 8A:
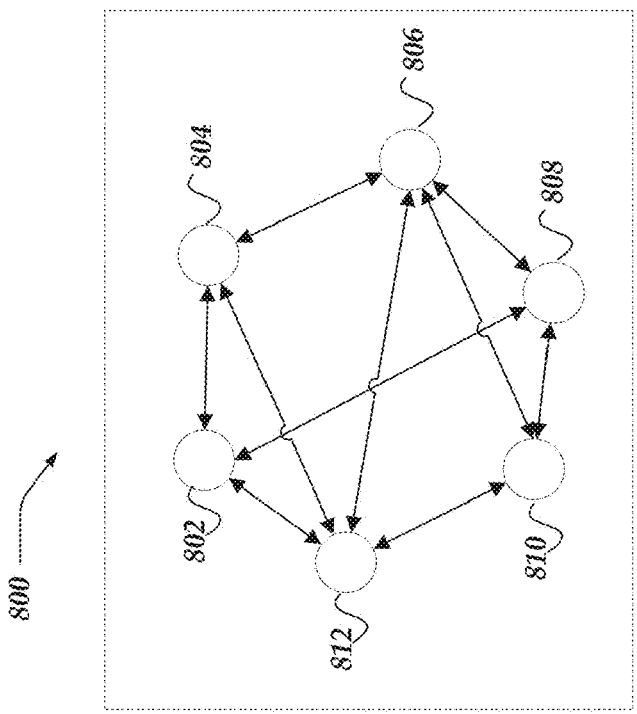
FIG. 8A illustrates a logical representation of a device relation model showing naïve relationships between the entities in accordance with the one or more embodiments.

FIGS. 8A and 8B illustrate how a device relation model may evolve as the NMCs gather more information about the relationships between the entities in a network.

FIG. 8A illustrates a logical representation of device relation model 800 showing naïve relationships between the entities in accordance with the one or more embodiments. In at least one of the various embodiments, for example, a NMC may initially determine the entities in a network by observing the network traffic to obtain the source/destination network address fields in the network packets that flow through the network. In at least one of the various embodiments, each unique network address may represent a different entity in the network.

Likewise, in some embodiments, the NMC may be arranged to observe responses to broadcast messages, or the like. Additionally, in some embodiments, the NMC may be provided other configuration information (e.g., information provided by a configuration management database) that defines some or all of the entities in the network.

In this example, for at least one of the various embodiments, the NMC has discovered/identified six entities in the network (entity 802 through entity 812). Accordingly, in some embodiments, the NMC may be arranged to generate a device relation model, such as, device relation model 800 that represents the six discovered entities as nodes in the graph. Likewise, in some embodiments, edges in device relation model 800 may represent the initial relationships as determined by the NMC. For example, in the initial stages of monitoring a network the NMC may be arranged to determine relationships based on which entities are observed to be communicating with each other.

However, in at least one of the various embodiments, NMCs may be arranged to provide a device relation model that represents the relationships between the entities that go beyond simple interconnectivity. Initially, in some embodiments, the NMC may define the initial relationships in the network based on which entities communicate with each other. However, in at least one of the various embodiments, as the NMC collects more information about the entities and their relationships to other entities, the NMC may modify device relation model 800 to reflect the deeper understanding of these relationships.

FIG. 8B illustrates a logical representation of device relation model 800 showing informed relationships between the entities in accordance with the one or more embodiments. In at least one of the various embodiments, after sufficient monitoring has occurred, the NMC may have observed enough network traffic to evaluate and weight the relationships of the entities in the network.

In at least one of the various embodiments, some of the initial relationships may be determined to be incidental, spurious, or otherwise unimportant. Accordingly, the NMC may be arranged to remove (or de-prioritize) edges from device relation model 800 that correspond to such relationships. For example, in at least one of the various embodiments, entities (e.g., Windows network domain controllers) in a network may be arranged to periodically exchange messages with one or more other entities for discovery/accountability purposes. Thus, in this example, some of the messaging observed by an NMC may be routine and otherwise not resulting from an interesting relationships between the sender and receiver.

In at least one of the various embodiments, NMC may be arranged to evaluate the communication between entities to attempt to determine the type of relationships and the importance of the relationships. Accordingly, in at least one of the various embodiments, NMCs may be arranged to collected metrics associated with the various network flows flowing the network to identify the flows that may be important. Likewise, in at least one of the various embodiments, NMC may be arranged discover and recognize the communication protocols used by entities in monitored networks. In some embodiments, the NMCs may be arranged to use the collected metrics and its understanding of the communication protocol to establish or prioritize relationships between the entities in the networks.

In this example, for at least one of the various embodiments, device relation model 800 has been modified to include relationships determined to be of importance. The nodes representing entities 802-812 are still present in but some of the edges that represent relationships in the network have been removed. For example, in FIG. 8A, device relation model 800 includes an edge between entity 804 and entity 812. In FIG. 8B, device relation model 800 omits the edge between entity 804 and entity 812.

In at least one of the various embodiments, the remaining edges in device relation model 800 represent relationships between the entities that the NMC determined to be important for a given device relation model. Note, in at least one of the various embodiments, an NMC may employ a variety of metrics, conditions, heuristics, or the like, to identify relationships that may be of interest. For example, an NMC may be arranged to identify entities that represent certain applications on the network, such as, database servers, database clients, email servers, email clients, or the like, by identifying the communication protocols that may be used by the particular applications. In other cases, the NMC may determine an important relationship based on the number or rate of packets exchanged between one or more entities. Accordingly, the NMC may be configured to prioritize relationships between entities that exchange a high volume of traffic.

In at least one of the various embodiments, the NMC may analyze observed traffic to identify network packets that flow through particular paths in the device relation model. In some embodiments, NMCs may be arranged to trace or identify such paths connecting related entities by observing common data carried in the payloads or header fields of the network packets that are passed among entities in the network. For example, an NMC may be arranged to observe sequence numbers, session identifiers, HTTP cookies, query values, or the like, from all entities participating in transactions on the network. In some embodiments, the NMC may correlate observed network packets that may be requests and responses based on the contents of the network packets and known information about the operation of the underlying applications or protocols.

FIGS. 9A and 9B provide additional illustration of how a device relation model may evolve as the NMCs gather more information about the relationships between the entities in a network.

FIG. 9A illustrates a logical representation of device relation model 900 showing relationships between the entities based on observed network connections in accordance with the one or more embodiments. In at least one of the various embodiments, the NMC has provided device relation model 900 that represents the relationships between entity 902 through entity 912. Here device relation model 900 shows relationships that may be associated with actual network links (e.g., physical links or virtual links) between the entities in the network. For example, the edges in device relation model 900 may correspond to network flows that have been observed in the network. In some embodiments, an NMC may readily deduce these types of connection relationships by examining the source/destination fields in network packets observed in the network. Accordingly, in this example, entity 906 may have been observed exchanging data with entity 908 over the network.

FIG. 9B illustrates a logical representation of device relation model 900 showing phantom edges that represent relationships between the entities in accordance with the one or more embodiments. In some embodiments, networks may include entities that have important logical/operational relationships even though they do not exchange network packets directly with each other. Here, the NMC has discovered relationships between entity 902 and entity 908 even though they do not communicate directly with each other. Likewise, the NMC has discovered relationships between entity 904 and entity 912 even though they do not communicate directly with each other. Similarly, entity 908, entity 910, entity 912 have been found to be related even though there is no direct network link or direct communication between them.

In at least one of the various embodiments, the NMC may be arranged to represent such relationships using phantom edges. Phantom edges may represent relationships between entities that do not correspond to direct network links. For example, entity 902 and entity 904 may be database clients and entity 908, entity 910, and entity 912 may be database servers. In this example, entity 902 and entity 904 access the database servers through entity 906. In this example, entity 906 may be proxy-based load balancer of some kind. Accordingly, in this example there is no direct network link between the database clients and the database servers. Nor, as represented, do the database server entities (entity 908, entity 910, and entity 912) have direct connections to each other.

But, in some embodiments, the NMC may determine that the three database server entities (entity 908, entity 910, and entity 912) are related because they are each receiving communications from the same load balancer (entity 906). Likewise, the NMC may determine a relationship between the database clients (entity 902 and entity 904) and the database servers (entity 908, entity 910, and entity 912) by observing the operation of the database transactions even though they do not communicate directly with each other.

Figure 10:
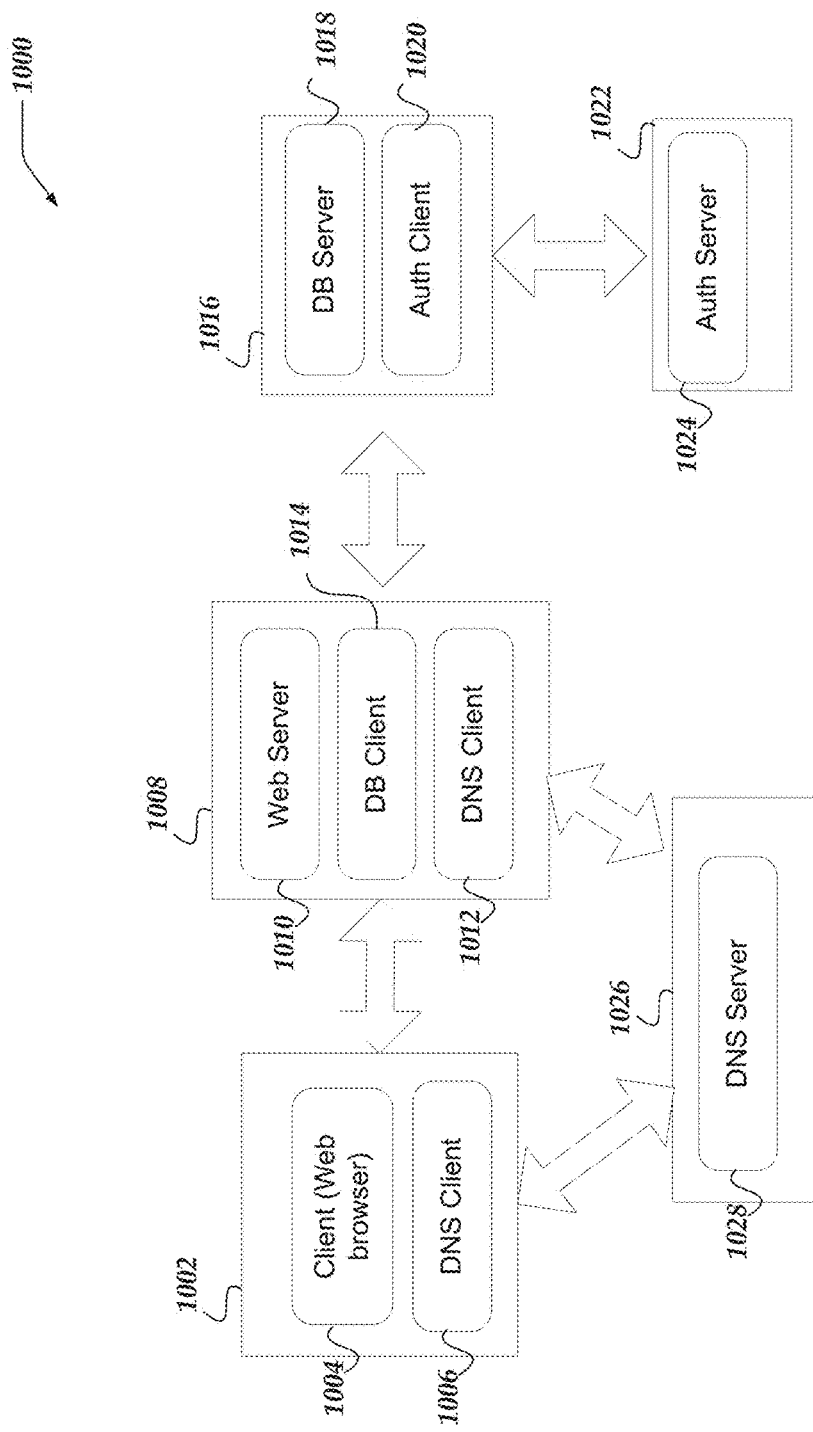
FIG. 10 illustrates a logical architecture of a network that includes entities in accordance with the one or more embodiments.

FIG. 10 illustrates a logical architecture of network 1000 that includes entities in accordance with the one or more embodiments. In at least one of the various embodiments, networks may include several (100s, 1000s, or more) computers or devices that may put network traffic on the network. As described above, (See, FIG. 4 and FIG. 5) network monitoring computers (NMCs) may be arranged to passively monitor the network traffic. In some embodiments, NMCs (not shown in FIG. 10) may have direct access to the wire traffic of the network enabling NMCs to access all of the network traffic in monitored networks.

In at least one of the various embodiments, the NMC may be arranged to identify entities in the network. Entities may include applications, services, programs, processes, network devices, or the like, operating in the monitored network. For example, individual entities may include, web clients, web servers, database clients, database servers, mobile app clients, payment processors, groupware clients, groupware services, or the like. In some cases, multiple entities may co-exist on the same network computer, or cloud compute instance.

In this example, client computer 1002 may be hosting web client 1004 and DNS client 1006. Further, server computer 1008 may be hosting web server 1010, database client 1014, and DNS client 1021. Also, in this example: server computer 1016 may be arranged to host database server 1018 and authorization client 1020; server computer 1022 may be arranged to host authorization server 1024; and server computer 1026 may be arranged to DNS server 1028.

In at least one of the various embodiments, some or all of the applications on a computer may correspond to entities. Generally, applications, services, or the like, that communicate using the network may be identified as entities by an NMC. Accordingly, there may be more than one entity per computer. Some server computers may host many entities. Also, some server computers may be virtualized machine instances executing in a virtualized environment, such as, a cloud-based computing environment. Likewise, one or more servers may running in containerized compute instances, or the like.

In at least one of the various embodiments, an individual process or program running on a network computer may perform more than one type of operation on the network. Accordingly, some processes or programs may be represented as more than one entity. For example, a web server application may have an embedded database client. Thus, in some embodiments, an individual web server application may contribute two or more entities to the device relation model.

In at least one of the various embodiments, the NMC may be arranged to monitor the network traffic to identify the entities and to determine their roles. In at least one of the various embodiments, the NMC may monitor the communication protocols, payloads, ports, source/destination addresses, or the like, or combination thereof, to identify entities.

In at least one of the various embodiments, the NMC may be preloaded with configuration information that it may use to identify entities and the services/roles they may be performing in the network. For example, if an NMC observes a HTTP GET request coming from a computer, it may determine there is a web client entity running on the host. Likewise, if the NMC observes a HTTP 200 OK response originating from a computer it may determine that there is a web server entity in the network.

In at least one of the various embodiments, the NMC may use some or all of the tuple information included in network traffic to distinguish between different entities in the network. Further, the NMC may be arranged to track the connections and network flows established between separate entities by correlating the tuple information of the requests and responses between the entities.

Figure 11:
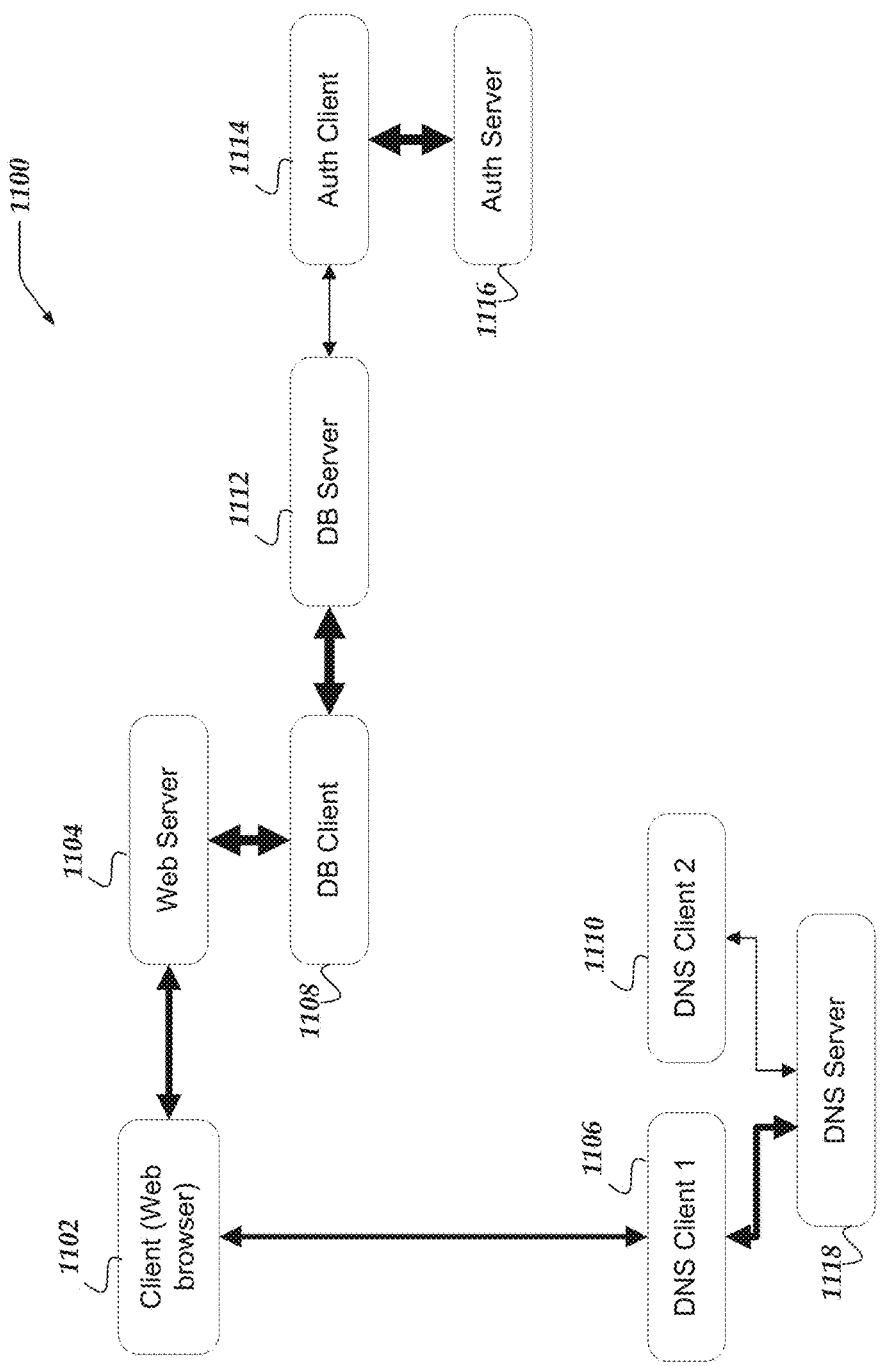
FIG. 11 illustrates a logical representation of a data structure for device relation model 1100 that includes entities in accordance with the one or more embodiments.

FIG. 11 illustrates a logical representation of a data structure for device relation model 1100 that includes entities in accordance with the one or more embodiments. In at least one of the various embodiments, network monitoring computers (NMCs) may be arranged generate device relation models, such as, device relation model 1100. In this example, device relation model 1100 represents the entities discovered network 1000 shown in FIG. 10.

In at least one of the various embodiments, as described above, NMCs may arrange device relation models to represent the relationship the entities have to each other rather than just modeling the network topology. For example, entity 1106, entity 1110, and entity 1118 are each related to the DNS system in network 1000. Therefore, in this example, for some embodiments, the NMC may arrange device relation model 1100 such that all of the DNS related entities (entity 1106, entity 1110, and entity 1118) are neighbors in the graph. Accordingly, in some embodiments, even though entity 1106 corresponds to DNS client 1006 on client computer 1002, the NMC may group entity 1106 with the other DNS entities rather than put it next other entities in the same computer.

In at least one of the various embodiments, the NMC may be arranged to generate device relation model 1100 based on the relationships that the entities have with each other. Accordingly, in some embodiments, the edges in the graph may be selected or prioritized (e.g., weighted) based on the type or strength of the relationship. In at least one of the various embodiments, the metrics used for prioritizing the edges in a device relation model may be selected/computed based on configuration information that includes rules, conditions, pattern matching, scripts, computer readable instructions, or the like. In some embodiments, NMCs may be arranged to apply this configuration information to the observed network packets (e.g., headers, payloads, or the like) to identify and evaluate relationships.

In at least one of the various embodiments, in device relation model 1100, the edge connecting entity 1104 and entity 1108 is depicted thicker to represent the close relationship the web server entity has with the database client entity. This reflects that the web server may be hosting a data centric web application that fetches data from a database when it receives HTTP requests from clients. Likewise, for device relation model 1100 the relationship between the database client (entity 1108) and the database server (entity 1112) is also a strong relationship. Similarly, the relationship between the authorization client (entity 1114) and the authorization server (entity 1116) is a strong relationship.

Also, in this example, the client (entity 1102) and DNS client 1 (entity 1106) have a strong relationship and it follows that DNS client 1 (entity 1106) has a strong relationship with the DNS server (entity 1118). However, DNS client 2 (entity 1110) has a weak relationship with the DNS server (entity 1118). In this example, this may make sense because DNS client 1 (entity 1106) is often used by the client (entity 1102) to send lookup requests to the DNS server. In contrast, in this example, DNS client 2 (entity 1110) is rarely used since it is running on the server computer (server computer 1008 in FIG. 10) and it may rarely issue name lookup requests.

In at least one of the various embodiments, the NMC may traverse device relation model 1100 to identify entities that may be closely related together and associate them into a group. For example, in some embodiments, in device relation model 1100, entity 1104, entity 1108, and entity 1112 may be grouped since they each have strong relationships with each other.

Accordingly, in at least one of the various embodiments, the NMC may be arranged to correlate error signals that may be associated with entity in the same to determine that an anomaly may be occurring. Related error signals that may propagate through a group of closely related entities may be recognized as a bigger problem that rises to an actual anomaly.

In at least one of the various embodiments, the NMC may be arranged to have configuration information, including, templates, patterns, protocol information, or the like, for identifying error signals in a group that may have correlations that indicate they indicate an anomaly.

In some embodiments, the NMC may be arranged to capture/monitor incoming and outgoing network traffic for entities in a monitored network. Also, the NMC may be arranged to employ various protocol analysis facilities, such as, state machines, mathematical models, or the like, to track expected/normal operations of different types of entities in a monitored network. Accordingly, in at least one of the various embodiments, the NMC may monitor the state of operations for entities that are working together. For example, a web client entity, such as, entity 1102, may make an HTTP request to web server entity 1104, that in turn triggers the web server entity 1104 to issue a database request to DB client entity 1108 that in turn is provided database server entity 1112. In some embodiments, the NMC may monitor the operation of each entity in the group by observing the network traffic exchanged between the entities in a group. Thus, in some embodiments, if an error at database server entity 1112 causes web client entity 1102 to drop its connection because of a timeout (or the user cancel the request, or repeats the same request before the response is sent), the NMC may be able to correlate the error at database server entity 1112 with the "timeout" error at web client entity 1102 to recognize what may be a serious anomaly.

Figure 12:
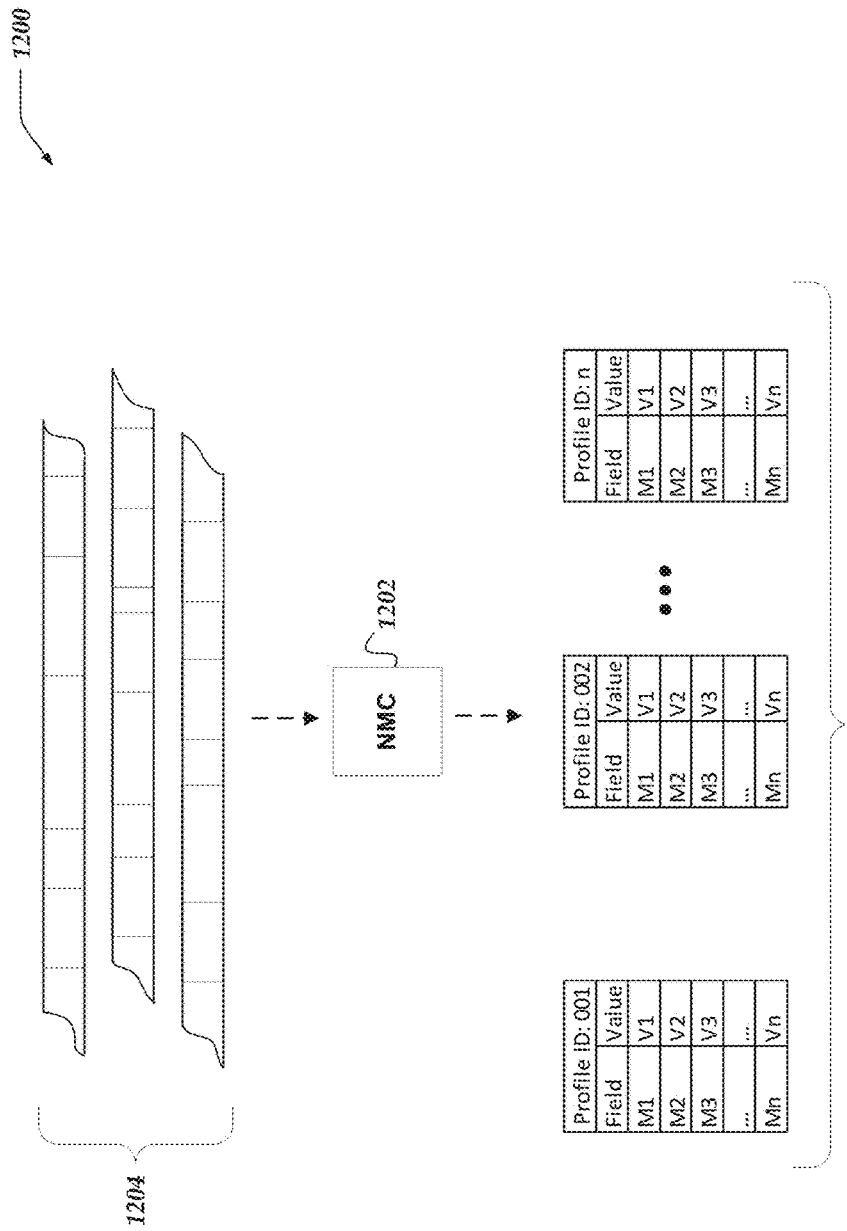
FIG. 12 represents a logical representation of a system for transforming monitored network traffic into profile objects in accordance with one or more of the various embodiments.

FIG. 12 represents a logical representation of system 1200 for transforming monitored network traffic into profile objects in accordance with one or more of the various embodiments. In one or more of the various embodiments, NMC 1202 may be arranged to passively monitor network traffic 1204. As described, in some embodiments, NMC 1202 may be arranged to provide various metrics associated with monitored network traffic 1204.

In one or more of the various embodiments, an NMC may be arranged to transform one or more collected metrics into profile objects suitable for machine learning training of activity models. Likewise, in one or more of the various embodiments, the profile objects may be provided to one or more trained activity models for classifications.

Accordingly, in one or more of the various embodiments, as described above, NMCs such as, NMC 1202 may be arranged to collect metrics from monitored network traffic and arrange them into metric profiles. Information from metric profiles may be selected or transformed to provide profile objects, such as profile objects 1206. In one or more of the various embodiments, profile objects may include one or more collections of fields with values that may be based on network traffic 1204 or metric profiles associated with network traffic 1202. In one or more of the various embodiments, one or more of the metrics included in a profile object may correspond to metrics collected by the NMC. In other embodiments, one or more of the metrics included in a profile object may be composites based on two or more metrics. Also, in one or more of the various embodiments, one or more metrics may be computed based on one or more observed metrics in one or more metric profiles.

Further, in one or more of the various embodiments, metric values included in profile objects may be normalized to a common schema as well as arithmetically normalized. Normalizing metric values to a common schema may include bucketing values. For example, in some embodiments, observed metrics that have continuous values may be mapped to named buckets, such as high, medium, low, or the like.

In one or more of the various embodiments, NMCs may be arranged to execute one or more ingestion rules to perform the data normalization required for mapping observed (raw) metrics into profile objects field value. in one or more of the various embodiments, one or more ingestion rules may be built-in to NMCs while other ingestion rules may be provided via configuration information, user input, or the like.

In one or more of the various embodiments, activity models may be employed by inference engines, analysis engines, anomaly engines, or the like, for determined privilege levels, privilege escalations, privilege related anomalies, or the like.

In one or more of the various embodiments, NMCs may be arranged to determine the occurrence of a privilege escalation based on one or more interactions between users or devices and the one or more privilege levels associated with the entities involved or affected by the interactions such that the one or more interactions or the one or more target entities are associated with privilege levels that exceed the one or more privilege levels associated with the one or more source entities or users that may be causing or performing the one or more interactions. For example, in one or more of the various embodiments, a privilege escalation may be detected if a device suddenly or unexpectedly accesses a large number of devices that have similar or lower privilege levels depending on the circumstances, Also, for example, in some embodiments, if the privilege level of a given device suddenly increases because it has accessed new higher privilege devices or one of the devices it frequently accessed suddenly has a much higher privilege level. In one or more of the various embodiments, NMCs may be arranged to employ configuration information, policy rules, built-in defaults, user-input, or the like, to determine the particular conditions or circumstances that may trigger a privilege escalation. Accordingly, in one or more of the various embodiments, one or more escalation events may be generated based on the occurrence of one or more privilege escalations. Further, in some embodiments, NMCs may be arranged to employ configuration information, policy rules, built-in defaults, user-input, or the like, to determine a mapping between the particular privilege escalations and escalation events.

Figure 13:
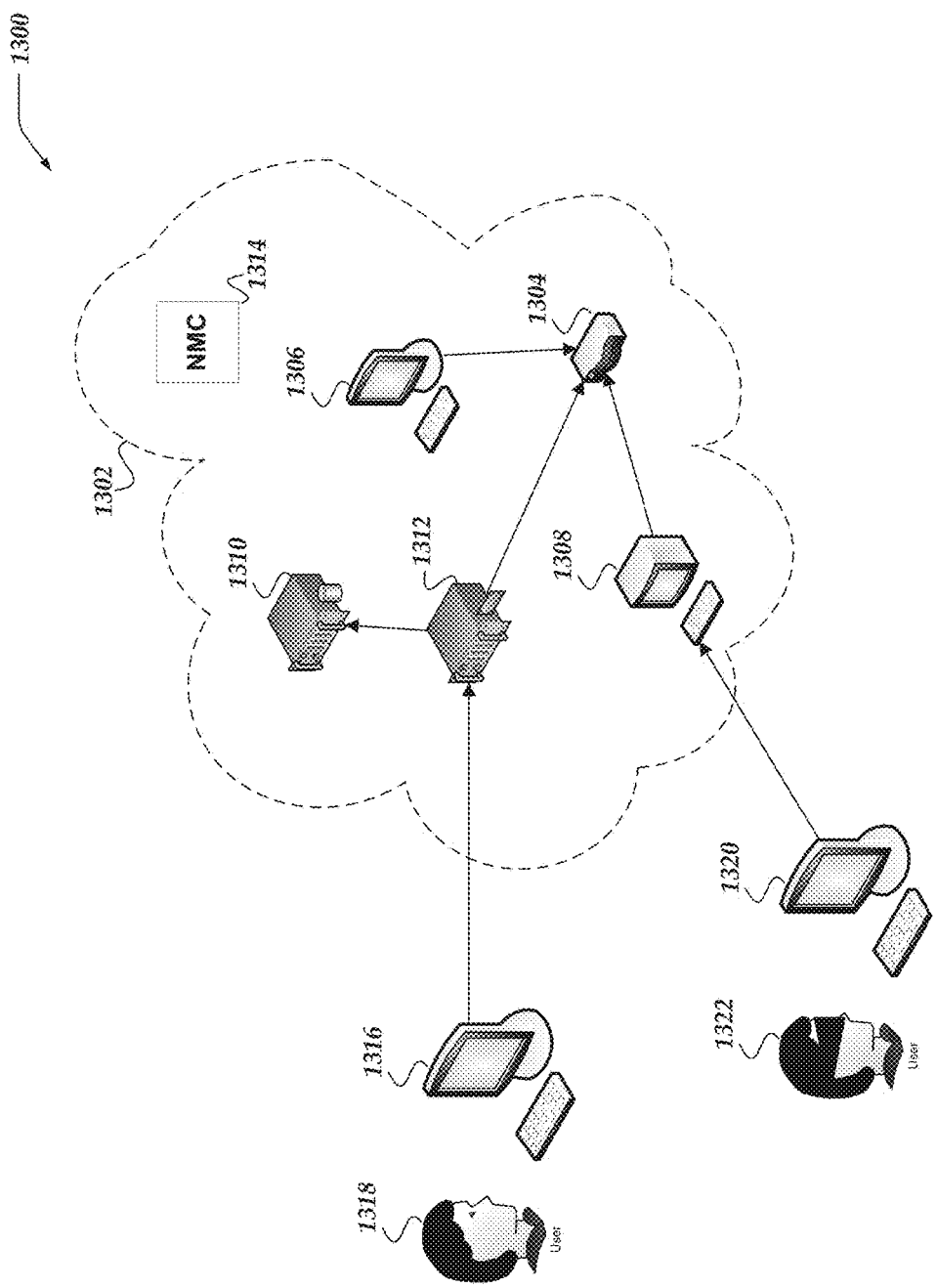
FIG. 13 illustrates a logical representation of a system for privilege inference and monitoring based on network behavior in accordance with one or more of the various embodiments.

FIG. 13 illustrates a logical representation of system 1300 for privilege inference and monitoring based on network behavior in accordance with one or more of the various embodiments. In one or more of the various embodiments, system 1300 includes networking environment 1302 that represents one or more monitored networks that includes various network devices.

In one or more of the various embodiments, NMCs such as NMC 1314 may be arranged to monitor network traffic that may be associated with many different devices or entities in one or more networks (e.g., networking environment 1302).

Accordingly, in one or more of the various embodiments, NMCs, such as, NMC 1304 may be arranged to instantiate one or more inference engines, such as inference engine 324 to determine a privilege level to associate with entities based on information discovered via network monitoring. In one or more of the various embodiments, determining the privilege level of entities may be based on inferences derived from device relation models, observed user behavior, other user behavior, heuristics, machine learning models, or the like, as well as, user inputs, including explicit user preferences, user feedback, or the like. In one or more of the various embodiments, if a user identifies a privilege level for one or more entities, the NMC may employ an inference engine to determine additional privilege levels for other entities that may be associated with entities that have their privilege level identified by a user.

In one or more of the various embodiments, inference engines may be arranged to associate a privilege level with some or all entities discovered in the network. Privilege levels may represent the amount or type of privileges available a user, application, client computer, network computer, or the like. In one or more of the various embodiments, inference engines may compute privilege levels based on various factors, including, one or more device relation models, heuristics, user activity, customer activity, user feedback, customer feedback, or the like. In one or more of the various embodiments, an inference engine may use a combination of heuristics, filters, rules, device relation models, or the like, to assign privilege levels to entities.

In one or more of the various embodiments, one or more device relation models, each representing different types of relationships between entities may be generated. Accordingly, in one or more of the various embodiments, a strength of relationship between or among various entities may be developed for different kinds of relationships.

In one or more of the various embodiments, privilege levels or relationships between entities may be based on their membership in one or more logical groups. In some embodiments, one or more entities that offer very different services may be related based on their association with a department, group, or organization. For example, a collection of the entities may be related because they are associated developing or deploying software products or services. For example, a source code repository server, build server, deployment server, continuous integration server, production server, or the like, may be logically related because they are associated with developing, maintaining, and deploying a software product. Accordingly, in one or more of the various embodiments, if a build server is determined to be have a high privilege level, a related source code repository is likely to have a high privilege level as well, and so on.

In some embodiments, machine learning systems may be employed to identify various statistical clusters or relationships based on archives of captured network traffic, collected metrics, or the like. In one or more of the various embodiments, such clusters may be based on features unique to a given networking environment. In other embodiments, archived network traffic data from different networking environment or organizations may be used with machine learning identify features common to networking environments that may be used for clustering or relation determinations.

Note, in one or more of the various embodiments, various relationship determining mechanisms employed by NMCs or inference engines may be overlapping. In some cases, different mechanisms may be additive, such that, as more relationship determining mechanisms find the same relationship, confidence weights associated with the privilege levels associated with the entities involved in those relationships may be increased.

In one or more of the various embodiments, as new entities join a monitored network they will be identified based on their unique network traffic footprint (e.g., unknown MAC address, or the like). Accordingly, in one or more of the various embodiments, an inference engine may attempt to classify the new entity and assign a privilege level to the new entity. If the inference engine identifies a known entity that is similar to the new entity it may derive an privilege level for the entity based on the privilege level associated with the known entity. In some embodiments, the inference engine may set the initial privilege level for the new entity based on the how close it's the new entity's characteristics (e.g., device profile) matches the known entities. A best match may result in the new entity being assigned the same privilege level. A less close match may result in the new entity receiving a privilege level that is less than the known entity.

In one or more of the various embodiments, a privilege level for an entity may be comprised of various components. Each component may correspond to different inputs provided to the inference engine, such as, device relation models, alert relevancy grades provided by users, one or more heuristics, application groups, various metrics groups, or the like. In some embodiments, each component of a privilege level may be increased or decreased independently. In some embodiments, the individual components of the privilege level may be normalized, weighted, summed, average, scaled, curve fit, or the like, to provide an overall privilege level for an entity.

In this example, NMC 1314 may be arranged to monitoring the network communication in network 1302 and assign privilege levels to the various entities. In this example, user 1318 may user client computer 1316 to remotely log-in to server 1312 (e.g., via a secure shell, or the like). Accordingly, in this example, after gaining remote access to network computer 1312, user 1318 may perform various actions that result in communication or access to network computer 1310 and router 1304. Also, in this example, blackhat hacker 1322 may employ client computer 1320 to gain unauthorized access to compromise client computer 1308. Then from, client computer 1308, hacker 1322 may access (or attempt to access) router 1304. Additionally, in this example, client computer 1306 may be communicating with router 1304 from inside network 1302.

In this example, because NMC 1314 is monitoring all of the network traffic in network 1302, it may compare the access or access patterns that occur to the current privilege levels associated with the various entities in the network.

For example, if user 1318 is an authorized IT administrator that often accesses network 1302 via client computer 1316, the privilege level associated with client computer 1316 may be high. Likewise, if administrators commonly user network computer 1312 as an entry point into network 1302 for performing administration of the network, network computer 1312 may also have a relatively high privilege level. Accordingly, in this example, access from client computer 1316 to network computer 1312 is unlikely to be a privilege escalation. Likewise, in this example, access from network computer 1312 to other computers or devices in the network may also be of no concern with respect to privilege escalations.

However, in this example, the access by hacker 1322 from client computer 1308 to router 1304 may trigger a privilege escalation because authorized administrators may rarely if ever access router 1304 via client computer 1308. For example, if hacker 1322 gains access to client computer 1308 via a successful phishing attack, hacker 1322 may attempt to compromise a more critical entity, such as, router 1304. Accordingly, NMC 1314 would observe the network traffic associated with the access attempt and flag it as privilege escalation because client computer 1308 is likely to be associated with a low privilege level that is not expected or allowed to access a critical entity, such as, router 1304.

Also, in this example, because NMC may be arranged to trace back from the privilege escalation event, it may determine that the privilege escalation originated from client computer 1320 which is outside of network 1302. Accordingly, in this example, the attempted privilege escalation may be considered to have a higher risk associated with it, which may trigger additional remediation or alerting.

In one or more of the various embodiments, NMCs may be arranged to categorize auto-discovered entities in three or more privilege categories, including, data servers, authentication services, control entities, or the like. Accordingly, in one or more of the various embodiments, privilege monitoring may be concentrated based on entity categorization. In some embodiments, data server entities may include entities, such as, web servers, file servers, database servers, or the like. In some embodiments, authentication service entities may include, domain controller, active directories, lightweight direction access protocol (LDAP) servers, or the like. And, in some embodiments, control entities may include entities that may remotely control other devices, computer, or entities, including entities that are discovered to use secure shell (ssh), remote desktop protocols (RPD), remote frame buffer protocols (e.g., virtual network computer—VNC), or the like.

In one or more of the various embodiments, NMCs may be arranged to employ protocol analysis, relation analysis, provided information, configuration information, or the like, to categorize entities into privilege categories. Also, in one or more of the various embodiments, within one or more categories, there may be different baseline privilege level values depending on one or more characteristics of a given entity. For example, in some embodiments, an internal database server used for serving images or static web assets may be associated with a lower privilege level than a database server that store sensitive customer information.

Accordingly, in some embodiments, the NMCs may be arranged to infer privilege levels based on nuances of the network traffic or network activity associated with a given entity. For example, in one or more of the various embodiments, NMCs may be arranged to recognize if sensitive information is being returned from queries to database servers. For example, an NMC may be configured to identify protocols associated with payment services, and then determine if Also, in one or more of the various embodiments, privilege levels may be based on one or more of privilege levels of connected entities, privilege levels of related entities, privilege levels of the logged in users, number of clients, additional metadata, or the like.

In one or more of the various embodiments, NMCs may be arranged to assign a baseline privilege level to an entity based on its privilege category. However, as described herein, additional factors may be employed to modify or adjust an entity's privilege level.

In one or more of the various embodiments, NMCs may be arranged to adapt network policies, security rules, or the like, to the privilege levels of the involved entities. In some embodiments, network policies, security rules, or the like, may be enforced more strictly or with less tolerance for entities associated with higher privilege levels. For example, in some embodiments, an NMCs may be arranged to enforce a policy that raises an operations alert if memory or CPU utilization for a server exceeds a threshold. Accordingly, in this example, in one or more of the various embodiments, the threshold values for memory or CPU utilization may be lowered for high privilege level entities or raised for low privilege entities. Similarly, in one or more of the various embodiments, a security rule that is configured to raise a security alert if the rate of data being copied out of the network exceeds a threshold may incorporate privilege levels to define the threshold values for raising alerts. For example, in one or more of the various embodiments, if data is detected as leaving the network from a high privilege level entity (e.g., a customer database or a private source control repository, or the like), the threshold levels associated with the rate of data transfer may be lower than low privilege level entities.

Also, in one or more of the various embodiments, NMCs may be arranged to enforce policy differently depending on the privilege level of the entities being accessed as well as the privilege level of the entities doing the accessing. For example, if a user associated with a privilege level of 5 is discovered accessing an entity having a privilege level of 7, while this may be a privilege escalation, it may be considered to have less risk compared to the same user accessing an entity having a privilege level of 15. Accordingly, in one or more of the various embodiments, policies, rules, or the like, may incorporate the "privilege distance" between the access and the entity being accessed for determining one or more actions to take in response to a privilege escalation.

In one or more of the various embodiments, privilege analysis provided by an NMC may be employed to determine which entities should or need to communicate with each other. Accordingly, in one or more of the various embodiments, NMCs may be arranged to provide one or more reports or visualizations that indicate privilege levels of entities in the monitored networks. In some embodiments, the reports may enable users to audit or review how many users may be accessing high privilege entities or to identify user with high privilege that may not need such high privilege. For example, an organization may have a four person IT team that should have high privilege which allow them to access high privilege entities. However, in this example, an NMCs identify that everyone in the organization has the same privilege level. Accordingly, in one or more of the various embodiments, the organization may be provided information or insights that enable them to re-configure their networks to reduce the number of users that have a high privilege level.

Also, in one or more of the various embodiments, NMCs may be arranged to use privilege analysis to auto-configure or recommend network configuration for micro-segmenting one or more monitored network to enable zero-trust networking. For example, in some embodiments, low privilege entities may be configured to be in different network segments than one or more high privilege entities. Thus, in the event that a low privilege entity is comprised, the bad actors may be unable to reach the high privilege entities because they are in different network segments that are configured to be unreachable from some privilege entities.

Figure 14:
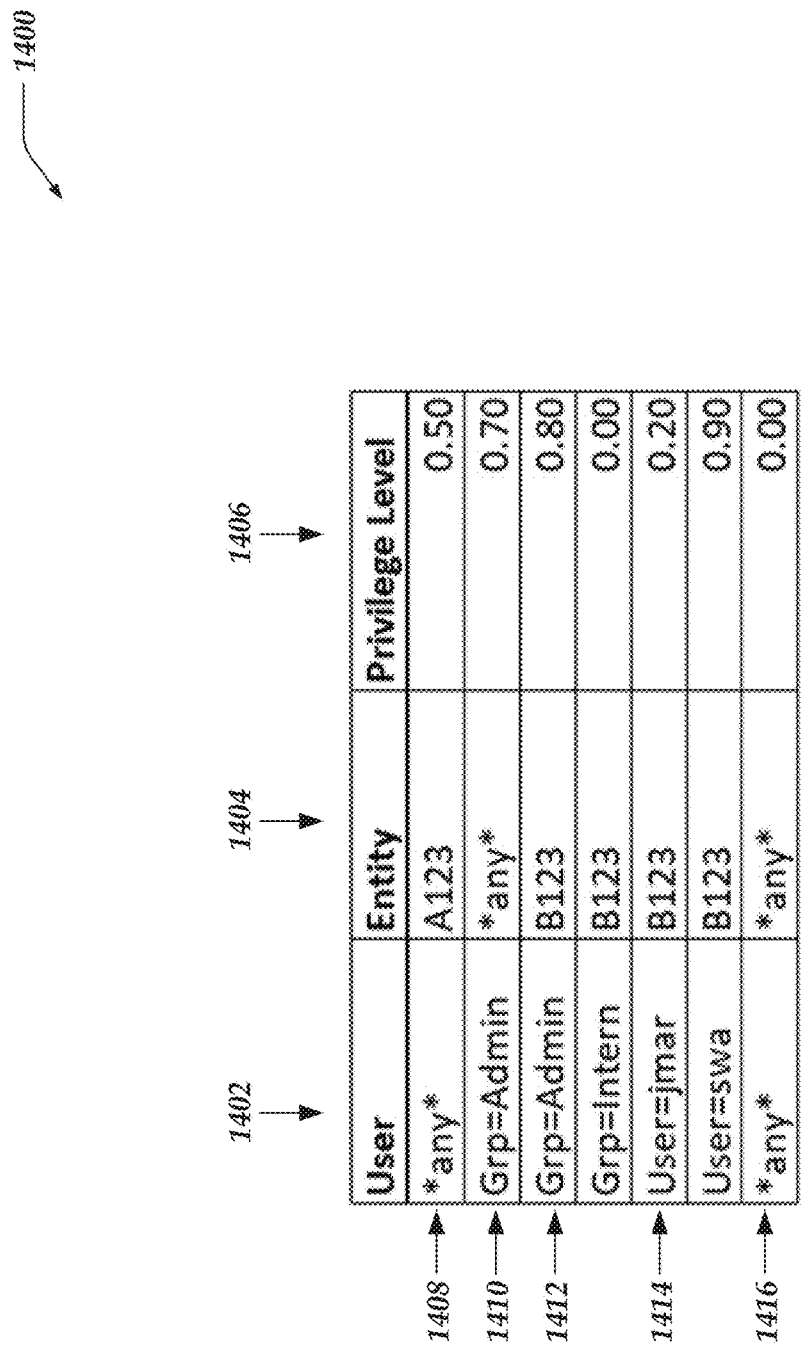
FIG. 14 illustrates a logical representation of a data object for associating privilege levels with users, groups, entities, or the like, in accordance with one or more of the various embodiments.

FIG. 14 illustrates a logical representation of data object 1400 for associating privilege levels with users, groups, entities, or the like, in accordance with one or more of the various embodiments. In one or more of the various embodiments, data object 1400 may include columns that include user 1402, entity 1404, privilege level 1406, or the like. Accordingly, entries in data objects, such as, data object 1400 may represent privilege levels for user, groups, entities, or the like, or combination thereof. In this example, user 1402 represent an identifier for a user, group, or the like. Entity 1404 represents a particular entity on the network. And, in this example, privilege level 1406 represent the privilege level for the user/entity combination. In this example, a higher valued privilege level indicates that the user/entity pair has more privilege than user/entity pairs associated with a lower valued privilege level.

In some embodiments, privilege levels for users or entities may be tracked separately from each other. In other embodiments, entity privilege levels may be tracked while user privilege levels may be ignored or tracked/enforced by other systems. Likewise, in some embodiments, user privilege levels may be tracked while entity privilege levels may be ignored or tracked/enforced by other systems. Also, in one or more of the various embodiments, as shown in the example of data object 1400, privilege levels may be for user/entity combinations.

In one or more of the various embodiments, the information in user 1402 may be arranged to represent user groups, organization departments, roles, or the like. In some embodiments, the additional user characteristics, some or all of which may be included in privilege level definitions/rules, may be stored in other systems. Accordingly, in some embodiments, an NMC may be arranged to lookup or otherwise obtain information from other internal or external systems for determining user characteristics that may contribute to determining privilege levels.

In this example, record 1408 indicates that any network activity associated with any user and entity A123 (e.g., a particular computer in the monitored network) start outs with a privilege level of 0.5. Record 1410 indicates network activity associated with any user that is in the Admin user-group has a privilege level of 0.70. Record 1412 indicates network activity associated with any user that is in the Admin user-group originating from entity B123 has a privilege level of 0.80. Also, as shown by record 1414, network activity associated with a specific user originating from entity B123 has a privilege level of 0.20. And, in this example, network activity associated with any user or any entity has a privilege level of 0.00.

Accordingly, in this example, the privilege inference engine (based on one or more rules) has determined that network activity associated with any user in the Administrator group has a relatively high privilege level of 0.70. However, in this example, the privilege inference engine has determined that network activity associated with the any user in the Administrator group that originates from entity B123 has a higher privilege level of 0.80. Note, the policy used to assign privilege levels may be driven by one or more privilege inference models, rules, instructions, configuration, or the like, or combination thereof that may be consumed by a privilege inference engine, or the like.

Also, in this example, for some embodiments, record 1416 shows that the default privilege level for any user on any entity is 0.00. In this example, an unclassified users on the network are afforded no privileges. Accordingly, in one or more of the various embodiments, upon detecting such a user accessing entities in the network, the NMCs may take appropriate as per its defined policy. For example, a defined policy may include notifying a responsible user to review the actions or roles of the unclassified user and then assign them to a group.

Further, in one or more of the various embodiments, while data object 1400 is illustrated here using a tabular format, these innovations are not so limited. Other data formats or arrangements having more or fewer properties, fields or columns may be employed to represent privilege level information collected, determined, or managed by NMCs, such as, databases, XML files, CSV, files, various in-memory data structures (e.g., linked lists, arrays, dictionaries, indices, or the like), JSON, or the like. One of ordinary skill in the art will appreciate that a table format is used here for brevity and clarity and that the innovations described herein anticipate the use other data formats/structures.

Generalized Operations

FIGS. 15-18 represent generalized operations for privilege inference and monitoring based on network behavior in accordance with one or more of the various embodiments. In one or more of the various embodiments, processes 1500, 1600, 1700, and 1800 described in conjunction with FIGS. 15-18 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 15-18 may be used for privilege inference and monitoring based on network behavior in accordance with at least one of the various embodiments or architectures such as those described in conjunction with FIGS. 4-14. Further, in one or more of the various embodiments, some or all of the actions performed by processes 1500, 1600, 1700, and 1800 may be executed in part by network monitoring engine 322, inference engine 324, analysis engine 326, anomaly engine 327, or the like, running on one or more processors of one or more network computers.

Figure 15:
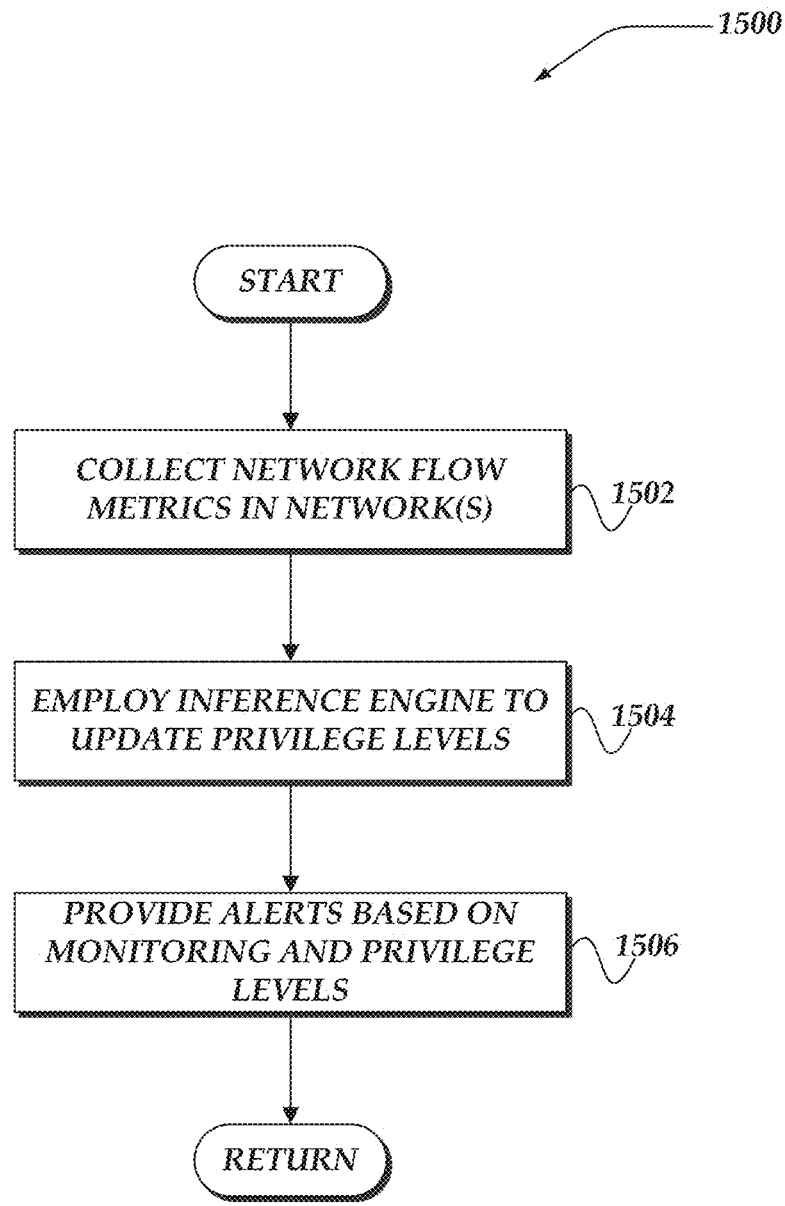
FIG. 15 illustrates an overview flowchart of a process for privilege inference and monitoring based on network behavior in accordance with one or more of the various embodiments.

FIG. 15 illustrates an overview flowchart of process 1500 for privilege inference and monitoring based on network behavior in accordance with one or more of the various embodiments. After a start block, at block 1502, in one or more of the various embodiments, one or more NMCs may be arranged to collect one or more metrics or other information based on monitoring the network traffic in the monitored networks. As described above, NMCs may be arranged to monitor the network traffic associated with various entities in the monitored networks. In some embodiments, the NMCs may employ some or all of the information collected during monitoring to generate one or more device relation models associated with privilege levels of the monitored entities.

At block 1504, in one or more of the various embodiments, the one or more NMCs may instantiate one or more inference engines to perform actions to update privilege level associated with entities in the monitored networks. In one or more of the various embodiments, the inference engines may analyze various inputs, such as user feedback, user activity, customer activity, one or more device relation models, or the like, to establish privilege levels for some or all of the entities in the monitored network. Note, in one or more of the various embodiments, the inference engine may be configured to exclude or include one or more entities from the privilege level determination process.

In one or more of the various embodiments, the inputs to the inference engine are not limited to metrics or conditions that were directly monitored by the NMC. Accordingly, in one or more of the various embodiments, the inference engine may be provided inputs from other services or applications that may be pushed to the inference engine via one or more interfaces or APIs. Likewise, in one or more of the various embodiments, the inference engine may be arranged to actively employ one or more interfaces or APIs to obtain information from one or more other applications or services to employ as inputs.

At block 1506, in one or more of the various embodiments, the one or more NMCs may be arranged to provide one or more alerts based on the monitored network activity and the privilege levels associated with the entities in the network. In one or more of the various embodiments, alerts generated at block 1508 represent the alerts associated with one or more privilege escalations or privilege escalation events that a NMC may observe in a monitored network.

In one or more of the various embodiments, the one or more alerts (that may include the one or more escalation events) may be communicated to one or more services or components that may be arranged to interpret the one or more alerts to determine one or more responses or actions. For example: alerts or events may be incorporated in various reports, including visualizations; used to inform users about privileges of arbitrary devices, computers, or applications not necessarily associated with any escalation events; used as input into one or more algorithms; combined with the output of one or more algorithms to perform result verification; or the like.

Next, control may be returned to a calling process.

Figure 16:
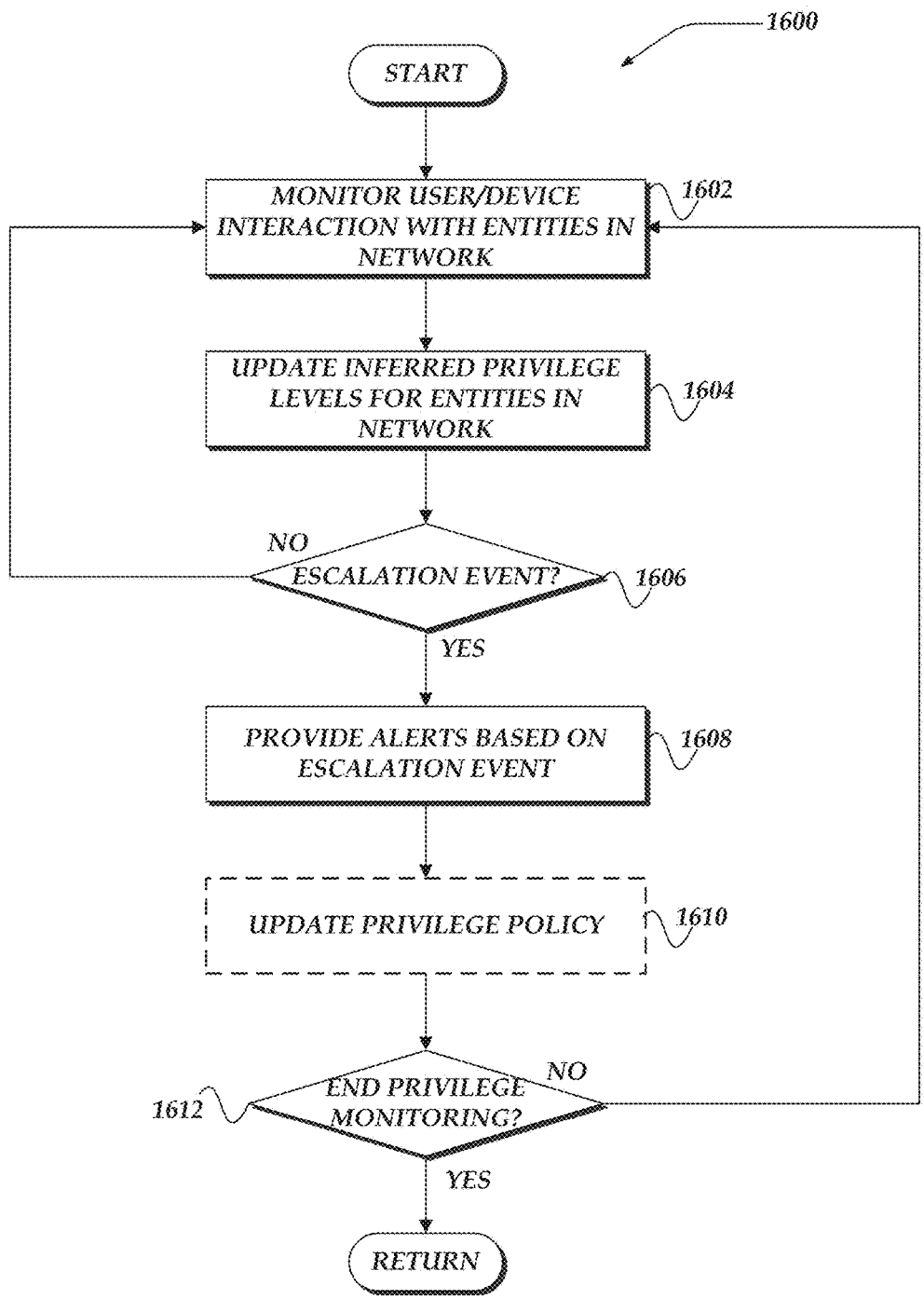
FIG. 16 illustrates a flowchart of a process for privilege inference and monitoring based on network behavior in accordance with one or more of the various embodiments.

FIG. 16 illustrates a flowchart of process 1600 for privilege inference and monitoring based on network behavior in accordance with one or more of the various embodiments. After a start block, at block 1602, one or more NMCs may be arranged to monitor user or device interactions with entities in the network. In one or more of the various embodiments, the NMCs may record various metrics associated with how users or devices interact with other entities in the monitored networks.

In one or more of the various embodiments, as described above, NMCs may be arranged to observe network behavior occurring on the networks they are configured to monitor. As described above, in some embodiments, NMCs may be arranged to use various policies engine, rules, configuration information, device relation models, or the like, or combination thereof, for inferring privilege level from observed network traffic or network metrics.

At block 1604, in one or more of the various embodiments, the NMCs may be arranged to update privilege level information associated with one or more entities in the monitored networks. Information associated with privilege levels may be provided to an inference engine that may be arranged to infer privilege levels based on information collected by the NMCs. Accordingly, in one or more of the various embodiments, the NMCs may continuously update one or more privilege level data objects or privilege level data stores.

At decision block 1606, in one or more of the various embodiments, if a privilege escalation event has occurred, control may flow to block 1606; otherwise, control may loop back to block 1602. In one or more of the various embodiments, privilege escalation in this context may include a user or device to action of conduction activity that may exceed the expected privilege level for an action, device, operation, or the like. Also, in some embodiments, a privilege escalation event may be detected if a user having a low privilege level taking an actions typically performed by users with higher privilege levels.

In one or more of the various embodiments, NMCs may be arranged to determine escalation events based on information, such as, configuration information, rules, computer readable instructions, user-input, database entries, configuration files, ASICs, FPGAs, or the like, or combination thereof. Accordingly, in one or more of the various embodiments, determining if network activity is associated with a privilege escalation event may depend on the particular configuration of the NMCs. Thus, in some embodiments, different organizations may have different policies for determining if network activity should be associated with a privilege escalation event.

At block 1608, in one or more of the various embodiments, the NMCs may provide one or more alerts associated with the privilege escalation event. In one or more of the various embodiments, one or more notification rules or alert rules may be associated with various escalation events. In some embodiments, default or generic notifications may be provided to one or more responsible users. In one or more of the various embodiments, NMCs may be configured to provide particular notifications for particular escalation events. Likewise, in some embodiments, escalation events may be associated with types, groups, or categories or escalation events. For example, in some embodiments, an NMC may be configured to send a particular notification to one or more particular users is an escalation even involves particular services, applications, user-groups, users, devices, computers, or the like.

Also, in one or more of the various embodiments, the one or more alerts (that may include the one or more escalation events) may be communicated to one or more services or components that may be arranged to interpret the one or more alerts to determine one or more responses or actions. For example: alerts or events may be incorporated in various reports, including visualizations; used to inform users about privileges of arbitrary devices, computers, or applications not necessarily associated with any escalation events; used as input into one or more algorithms; combined with the output of one or more algorithms to perform result verification; or the like.

At block 1610, in one or more of the various embodiments, optionally, the NMCs may be arranged to update or modify one or more privilege policies. In some embodiments, the NMCs may update or modify one or more privilege rules based on one or more responses to the privilege escalation event. In one or more of the various embodiments, NMCs may be arranged to provide a user interface that enables users to acknowledge, score, or prioritize escalation alerts. Accordingly, in one or more of the various embodiments, one or more NMCs may be arranged to modify privilege levels based on user interactions with alerts. For example, if the users accept or label particular escalation events as of no concern, the NMCs may be arranged to interpret such acceptance as an indication that the activity should be associated with a higher privilege level and increase it according to a defined formula.

Also, in one or more of the various embodiments, one or more privilege levels may be configured to be fixed or immutable. Accordingly, an organization may determine for some devices, users, user groups, applications, services, or the like, the privilege level should remain at a configured value.

Likewise, in one or more of the various embodiments, one or more privilege levels may be associated with a decay function that works to automatically decrease or increase privilege level values to a defined baseline. For example, a default privilege level may be setup for any user or any device. In this example, if administrators begin regular using a low privilege device for high privilege activities, escalation events may be generated. However, in this example, if responsible users ignore or mark such events as okay, the NMC may be arranged to increase the corresponding privilege level. This policy may reflect an assumption that devices or users associated with acceptable activity should not be generating escalation events. Accordingly, their privilege level may be increased to reflect a shift activities in the network. However, over time if the privileged activity does not continue, the NMC may be arranged to automatically reduce the privilege level back to a baseline level.

This block is indicated as being optional because in some embodiments the one or more privilege escalation events may trigger a privilege policy update or modification.

At decision block 1612, in one or more of the various embodiments, if privilege monitoring is ended, control may be returned to a calling process; otherwise, control may loop back to block 1602. In one or more of the various embodiments, privilege monitoring may be configured to continuous and in real-time. In other cases, privilege monitoring may be activated or disabled based on various rules, policies, or conditions. Likewise, privilege monitoring may be directed at different networks, parts networks, entities, or the like, based on configuration information, rules, policies, user-input, or the like. For example, in some embodiments, an NMC may be configured to activate wide-spread privilege monitoring if a remote login is detected on a particular computer.

Also, in one or more of the various embodiments, NMCs may be arranged to run privilege monitoring or analysis on network traffic that was captured and stored previously. For example, in some embodiments, NMCs may be arranged to analyze captured network to perform historical analysis or forensic investigations.

Next, control may be returned to a calling process.

Figure 17:
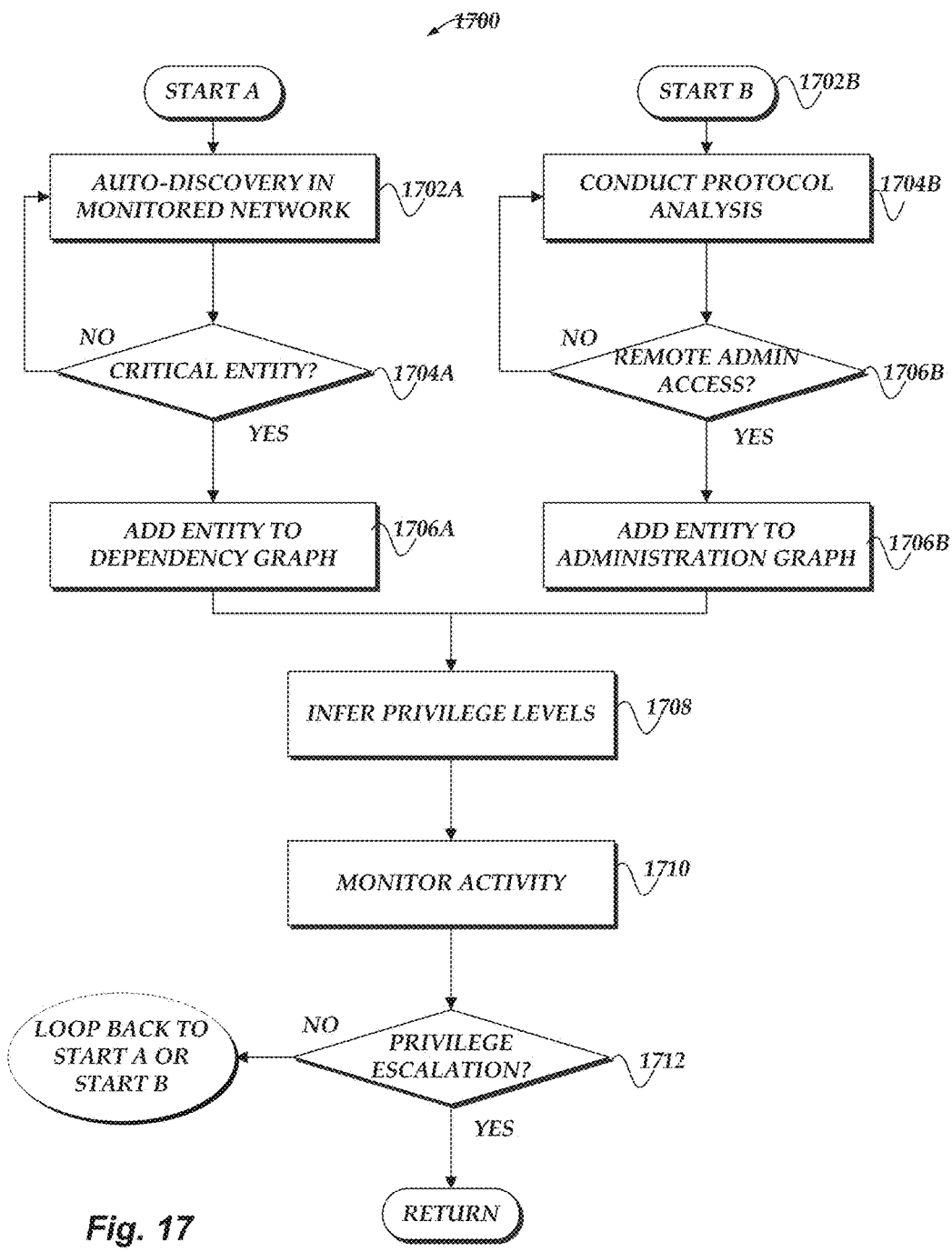
FIG. 17 illustrates a flowchart of a process for privilege inference and monitoring based on network behavior in accordance with one or more of the various embodiments.

FIG. 17 illustrates a flowchart of process 1700 for privilege inference and monitoring based on network behavior in accordance with one or more of the various embodiments. Note, this process is illustrated with two different start paths, consisting of Start block A through block 1706A and Start block B through block 1706B that represent different action flows that different instances of process 1700 may perform. In practice there may be more than one NMC or NMC components (e.g., network monitoring engine, interference engine, analysis engine, anomaly engine, or the like) operating at a time.

After start block A, at block 1702A, in one or more of the various embodiments, one or more NMCs may be arranged to monitor network activity to auto-discovery entities or entity relationships in the monitored network. In one or more of the various embodiments, as described above, NMCs may be arranged to monitor network activity on monitored networks to identify entities operating on the network. In some embodiments, the auto-discovery process may be on-going or in real-time such that as entities join or leave the network, the discovery information (e.g., entity records, relation graphs, or the like) may be automatically updated or refined.

At decision block 1704A, in one or more of the various embodiments, if the one or more NMCs discover a critical entity, control may flow to block 1706A; otherwise, control may loop back to block 1702A. In one or more of the various embodiments, NMCs may be arranged to use information, such as, configuration information, rules, policies, computer readable instructions, user-input, of the like, or combination thereof, to determine if a discovered entity is a critical or potentially critical entity. In one or more of the various embodiments, the specific network conditions, entity behavior, entity characteristics, or the like, for determining if an entity is critical may vary depending on the goals or requirement of the network owning organization.

Similarly, in one or more of the various embodiments, entities may be removed or delisted from the set of critical entities if its behavior or characteristics change such that it is determined to be non-critical. Likewise, an entity may be removed or delisted from the set of critical entities as additional behavior or characteristics information of the entity is discovered by the NMC. For example, in one or more of the various embodiments, NMCs may be arranged to use a progressive analysis process that initially determines that a network computer is not critical. Accordingly, for example, the criticality (or importance) of the network computer may be modified as additional behavior characteristics or configuration characteristics associated with the network computer are discovered, At block 1706A, in one or more of the various embodiments, the critical entity may be added to a dependency graph that may be associated with privilege monitoring. As mentioned above in some detail, NMCs may generate one or more device relation graphs that include some or all of the entities in monitored networks. In some embodiments, NMCs may be arranged to use different relation graphs for different purposes. In some embodiments, the relations recorded in the different graphs may represent different types of relations, such as, importance of an entity to other entities, privilege relationships, communication/traffic relationships, user or entity activity with other entities, or the like. In some embodiments, the "same" graph data structure or data model may be used to represent different types of relationships. For example, one data model may include one set of entity nodes but use multiple sets of edges where each set of edges represents a different type of relations.

After start block B, at block 1702B, one or more NMCs may be arranged to conduct protocol analysis of monitored network traffic. As discusses above, NMCs may be arranged to employ various device profiles, application profiles, protocol knowledge, or the like, that may be compared to network activity or network behavior of one or more entities in the network.

At decision block 1706B, in one or more of the various embodiments, if NMCs observe one or more remote access logins, control may flow to block 1706B; otherwise, control may loop back to block 1704B. In one or more of the various embodiments, NMCs may be arranged to pay special attention to entities that may be associated with behavior for remotely accessing other entities. Accordingly, in one or more of the various embodiments, NMCs may employ protocol analysis or behavior analysis to identify behavior associated with remote access or remote control. For example, in one or more of the various embodiments, NMCs may identity network traffic associated with remote desktop protocol (RDP), remote framebuffer protocol (RFB), secure shell (SSH), telnet sessions, or the like. These or other protocols may be associated with users logging in to remote computers. In some cases, users or entities associated with remote administration may be higher privilege users or entities.

At block 1706B, in one or more of the various embodiments, the information associated with the remote access may be added to an administration graph that shows relationships administrator activity. In one or more of the various embodiments, this information may include relationship information that may be detected during administrative activities. For example, if an administrator logs into computer A123 and from there she remotely administrates one or more other computers, the administration relation graph may be updated indicate that there is an administrative relation between computer A123 and the one or more administered computers.

In one or more of the various embodiments, the administrative relation graph may be separate from other relation graphs that may represent different types of relations. Likewise, in some embodiment, the two or more relation graphs may be overlaid on the same data model. For example, NMCs may be arranged to track multiple types of relations using the same relation graph.

At block 1708, in one or more of the various embodiments, NMCs may instantiate one or more inference engines to analysis the available privilege activity information to infer privilege levels to associated with user, devices, services, applications, or the like.

In one or more of the various embodiments, inference engines may be arranged to analyze multiple sources of privilege activity information or privilege relation information to infer privilege levels for users, devices, application, services, or the like.

In one or more of the various embodiments, default or baseline privilege level values may be associated with various entities, such as, users, devices, application, services, or the like, or categories thereof. Accordingly, in one or more of the various embodiments, an inference engine may use configuration information to establish initial, default, or baseline privilege levels for various entities. In some embodiments, the inference engine may employ a variety of heuristics, ad-hoc pattern matching, rules, machine learning, or the like, to determine privilege levels for various entities in the monitored networks.

At block 1710, in one or more of the various embodiments, the one or more NMCs may be arranged to monitor the network activity that occurs in the monitored networks. In one or more of the various embodiments, NMCs may continuously monitor some or all the monitored networks. Accordingly, network activity may be compared to privilege level.

At decision block 1712, in one or more of the various embodiments, if the NMC detects one or more privilege escalations, control may return to a calling process that may be arranged to process privilege escalation events; otherwise, control may loop back to Start Block A or Start Block B. In one or more of the various embodiments, privilege escalation may be detected if an entity associated with a lower privilege level accesses one or more entities that have a higher privilege level. Also, in one or more of the various embodiments, privilege level may be associated with the type of activity is occurring. Accordingly, in one or more of the various embodiments, additional details regarding the particular activity may be available to the NMC. If so, in some embodiments, NMCs may be configured to consider the activity being performed as well as the entities that are being accessed for determining if there is a privilege escalation.

Likewise, in one or more of the various embodiments, NMCs may be configured to ignore some privilege escalations or prioritize others. For example, configuration information may be used to define one or more activities that should be ignored for purposes of determining a privilege escalation.

Figure 18:
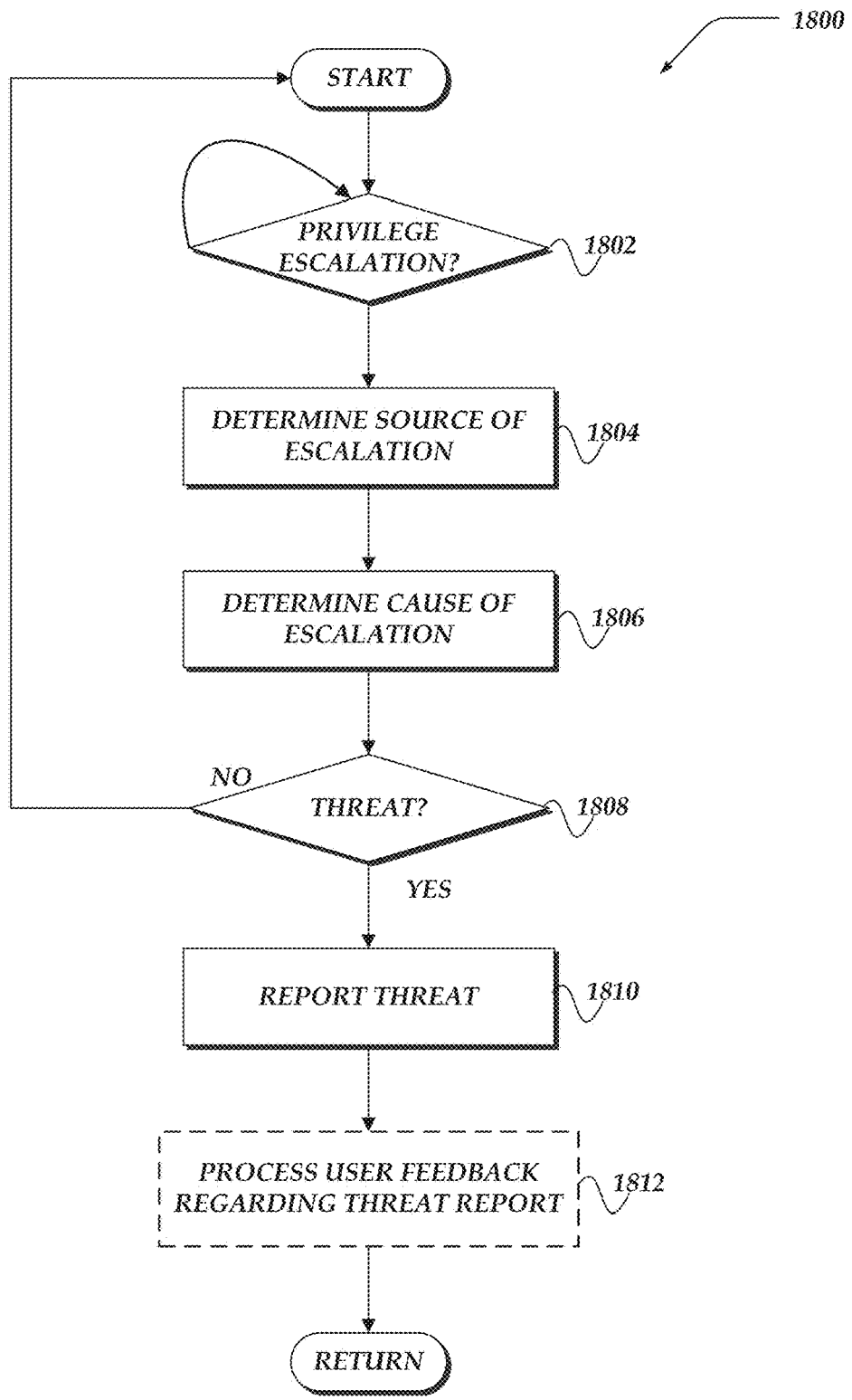
FIG. 18 illustrates a flowchart of a process for determining causes of privilege escalation based on network behavior in accordance with one or more of the various embodiments.

FIG. 18 illustrates a flowchart of process 1800 for determining causes of privilege escalation based on network behavior in accordance with one or more of the various embodiments. After a start block, at decision block 1802, if one or more NMCs detect one or more privilege escalation events, control may flow to block 1804; otherwise, control may loop back to decision block 1802.

At block 1804, in one or more of the various embodiments, the one or more NMCs may be arranged to determine the source or sources of the privilege escalation. In one or more of the various embodiments, NMCs may be arranged to traverse one or more relation models to identify entities that may be associated with the point in the network where the privilege escalation event may occur.

In one or more of the various embodiments, NMCs may be arranged to trace network flows that pass through one or more entities based on header or tuple information associated with the network traffic. Also, in one or more of the various embodiments, the network traffic flows or paths may be compared to one or more relation models to determine the potential sources of the privilege escalation.

At block 1806, in one or more of the various embodiments, the one or more NMCs may be arranged to determine one or more causes of the privilege escalation events. Also, in one or more of the various embodiments, NMCs may be arranged to interpret network traffic associated with one or more application protocols to determine a cause or source of the escalation. In some embodiments, NMCs may be arranged to determine that network traffic associated with one application is related to activity from another entity. In some embodiments, more than one application may use that same or similar credential information (associated with the user). Accordingly, in some embodiments, NMCs may be arranged to correlate network traffic for different applications or different entities based on common credential information that may be included in the network traffic originating or terminating at various entities in the network.

For example, a low privileged user may be detected performing a remote access into a low privileged computer. And, then from there, the low privilege user may be detected logging into to a high privileged computer (causing a privilege escalation). In this example, the cause of the escalation is the user that remotely logged into the low privilege computer. Note, other considerations may be applied as well, such as, the behavior of the user, the role or access rights associated with the user, behavior history of the user, behavior history of the computers or entities involved in the worrisome transactions, or the like.

At decision block 1808, in one or more of the various embodiments, if the one or more NMCs determines that the escalation may be associated with a threat, control may flow to block 1801; otherwise, control may loop back to decision block 1802. In one or more of the various embodiments, threat determination may be based on applying one or more policy rules, or the like, that may be arranged to characterize the various escalation events and map them one or more actions.

At block 1810, in one or more of the various embodiments, the one or more NMCs may be arranged to report the threat. In one or more of the various embodiments, NMCs may be arranged to support a variety of report mechanisms, including sending emails, SMS messages, paging, application push notification, user-interface based alerts/alarms, or the like. In some embodiments, NMCs may provide or forward threat report information to other applications or services, such as, trouble ticketing systems, that may be arranged to investigate, monitor, or resolve the potential threats identified by the NMCs.

At block 1812, in one or more of the various embodiments, optionally, the one or more NMCs may be arranged to process user feedback associated with the threat reports. In one or more of the various embodiments, NMCs may be provided information associated with user feedback or user interaction with the threat reports. In some embodiments, threat reports may include interactive user-interfaces that enable users to provide feedback associated with the various escalation events referenced in the report. In some embodiments, feedback may include users indicating if an event was of no-concern' or indicate that the event or report was correct. Accordingly, in one or more of the various embodiments, one or more NMCs may be arranged to modify its threat assessment rules based on user feedback. For example, if events associated with a particular entity are commonly marked as of no-concern, NMCs may be arranged to reduce privilege level (or one or more components that contribute to the overall privilege level) of the associated entities.

In one or more of the various embodiments, the NMCs may be arranged to identify the rules associated with escalation events to enable a user to modify those rules to improve the identification of threat events. The particular modifications may include, adjusting threshold values, adding or removing conditions, modifying pattern matching rules, modify heuristics, retraining machine learning models, or the like, or combination thereof.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic using one or more network computers, wherein execution of instructions by the one or more network computers perform the method comprising:
   instantiating a monitoring engine to perform actions, including:
      monitoring network traffic associated with a plurality of entities in one or more networks; and
      providing a device relation model based on the network traffic, the plurality of entities, and the one or more metrics based on the monitored network traffic; and
   instantiating an inference engine to perform actions, including:
      associating the plurality of entities with one or more privilege levels based on one or more device relation models and the one or more metrics; and
      increasing the one or more privilege levels for a source entity based on one or more metric values that are associated with one or more target entities that are linked to the source entity; and
   instantiating an anomaly engine to perform actions, including:
      determining one or more interactions between one or more source entities and the one or more target entities;
      providing one or more escalation events to one or more users based on the one or more interactions and the one or more privilege levels associated with the one or more source entities; and
      employing related credential information employed with one or more different applications having related activity from the one or more other activities to identify one or more sources of privilege escalation.

2. The method of claim 1, wherein the anomaly engine performs further actions, comprising:
   determining each of the one or more users that is associated with one or more privilege policies; and
   employing the one or more privilege policies to determine which of the one or more escalation events to provide to each of the one or more users.

3. The method of claim 1, wherein the anomaly engine performs further actions, comprising:
   employing one or more responses by the one or more users to the one or more provided escalation events to modify one or more privilege policies associated with the one or more users.

4. The method of claim 1, further comprising:
   employing the monitoring engine to perform further actions including discovering a new entity in the one or more networks based on privilege activity monitoring; and
   employing the inference engine to perform further actions, including:
      adding the new entity to a dependency graph as a critical entity based on one or more of network conditions, entity behavior, or entity characteristics; and
      adding one or more inferred privilege levels to the critical entity in the dependency graph based on one or more of privilege activity information or privilege relation information.

5. The method of claim 1, further comprising:
   employing the monitoring engine to perform further actions including discovering a new entity in the one or more networks based on protocol analysis and identifying remote access behavior directed to the one or more entities; and
   employing the inference engine to perform further actions, including:
      adding the new entity to an administration graph based on one or more of relationship information detected during administrative activities by the new entity; and
      adding one or more inferred privilege levels to the new entity in the administration graph based on one or more of privilege activity information or privilege relation information.

6. The method of claim 1, wherein the anomaly engine performs further actions, comprising:
   traversing the one or more device relation models to trace network flows that pass through the one or more entities; and
   determine network traffic flows that are associated with one or more different applications having related activity from one or more other entities.

7. A system for monitoring network traffic in a network: one or more network computers, comprising:
one or more memories that store instructions; and
one or more processors that execute instructions that perform actions, including:
instantiating a monitoring engine to perform actions, including:
monitoring network traffic associated with a plurality of entities in one or more networks; and
providing a device relation model based on the network traffic, the plurality of entities, and the one or more metrics based on the monitored network traffic; and
instantiating an inference engine to perform actions, including:
associating the plurality of entities with one or more privilege levels based on one or more device relation models and the one or more metrics; and
increasing the one or more privilege levels for a source entity based on one or more metric values that are associated with one or more target entities that are linked to the source entity; and
instantiating an anomaly engine to perform actions, including:
determining one or more interactions between one or more source entities and the one or more target entities;
providing one or more escalation events to one or more users based on the one or more interactions and the one or more privilege levels associated with the one or more source entities; and
employing related credential information employed with one or more different applications having related activity from the one or more other activities to identify one or more sources of privilege escalation.

8. The system of claim 7, wherein the anomaly engine performs further actions, comprising:
determining each of the one or more users that is associated with one or more privilege policies; and
employing the one or more privilege policies to determine which of the one or more escalation events to provide to each of the one or more users.

9. The system of claim 7, wherein the anomaly engine performs further actions, comprising:
employing one or more responses by the one or more users to the one or more provided escalation events to modify one or more privilege policies associated with the one or more users.

10. The system of claim 7, further comprising:
employing the monitoring engine to perform further actions including discovering a new entity in the one or more networks based on privilege activity monitoring; and
employing the inference engine to perform further actions, including:
adding the new entity to a dependency graph as a critical entity based on one or more of network conditions, entity behavior, or entity characteristics; and
adding one or more inferred privilege levels to the critical entity in the dependency graph based on one or more of privilege activity information or privilege relation information.

11. The system of claim 7, further comprising:
employing the monitoring engine to perform further actions including discovering a new entity in the one or more networks based on protocol analysis and identifying remote access behavior directed to the one or more entities; and
employing the inference engine to perform further actions, including:
adding the new entity to an administration graph based on one or more of relationship information detected during administrative activities by the new entity; and
adding one or more inferred privilege levels to the new entity in the administration graph based on one or more of privilege activity information or privilege relation information.

12. The system of claim 7, wherein the anomaly engine performs further actions, comprising:
traversing the one or more device relation models to trace network flows that pass through the one or more entities; and
determine network traffic flows that are associated with one or more different applications having related activity from one or more other entities.

13. A processor readable non-transitory storage media that includes instructions for monitoring network traffic using one or more network monitoring computers, wherein execution of the instructions by the one or more network computers perform the method comprising:
instantiating a monitoring engine to perform actions, including:
monitoring network traffic associated with a plurality of entities in one or more networks; and
providing a device relation model based on the network traffic, the plurality of entities, and the one or more metrics based on the monitored network traffic; and
instantiating an inference engine to perform actions, including:
associating the plurality of entities with one or more privilege levels based on one or more device relation models and the one or more metrics; and
increasing the one or more privilege levels for a source entity based on one or more metric values that are associated with one or more target entities that are linked to the source entity; and
instantiating an anomaly engine to perform actions, including:
determining one or more interactions between one or more source entities and the one or more target entities;
providing one or more escalation events to one or more users based on the one or more interactions and the one or more privilege levels associated with the one or more source entities; and
employing related credential information employed with one or more different applications having related activity from the one or more other activities to identify one or more sources of privilege escalation.

14. The media of claim 13, wherein the anomaly engine performs further actions, comprising:
determining each of the one or more users that is associated with one or more privilege policies; and
employing the one or more privilege policies to determine which of the one or more escalation events to provide to each of the one or more users.

15. The media of claim 13, wherein the anomaly engine performs further actions, comprising:
employing one or more responses by the one or more users to the one or more provided escalation events to modify one or more privilege policies associated with the one or more users.

16. The media of claim 13, further comprising:
employing the monitoring engine to perform further actions including discovering a new entity in the one or more networks based on privilege activity monitoring; and
employing the inference engine to perform further actions, including:
adding the new entity to a dependency graph as a critical entity based on one or more of network conditions, entity behavior, or entity characteristics; and
adding one or more inferred privilege levels to the critical entity in the dependency graph based on one or more of privilege activity information or privilege relation information.

17. The media of claim 13, further comprising:
employing the monitoring engine to perform further actions including discovering a new entity in the one or more networks based on protocol analysis and identifying remote access behavior directed to the one or more entities; and
employing the inference engine to perform further actions, including:
adding the new entity to an administration graph based on one or more of relationship information detected during administrative activities by the new entity; and
adding one or more inferred privilege levels to the new entity in the administration graph based on one or more of privilege activity information or privilege relation information.

18. The media of claim 13, wherein the anomaly engine performs further actions, comprising:
traversing the one or more device relation models to trace network flows that pass through the one or more entities; and
determine network traffic flows that are associated with one or more different applications having related activity from one or more other entities.

19. A network computer for monitoring communication over a network between two or more other computers, comprising:
one or more memories that store instructions; and
one or more processors that execute instructions that perform actions, including:
instantiating a monitoring engine to perform actions, including:
providing one or more metrics for a plurality of entities in one or more networks based on monitored network traffic; and
instantiating an inference engine to perform actions, including:
associating the plurality of entities with one or more privilege levels based on one or more device relation models and the one or more metrics; and
increasing the one or more privilege levels for a source entity based on one or more metric values that are associated with one or more target entities that are linked to the source entity; and
instantiating an anomaly engine to perform actions, including:
determining one or more interactions between one or more source entities and the one or more target entities; and
providing one or more escalation events to one or more users based on the one or more interactions and the one or more privilege levels associated with the one or more source entities.

20. The network computer of claim 19, wherein the anomaly engine performs further actions, comprising:
determining each of the one or more users that is associated with one or more privilege policies; and
employing the one or more privilege policies to determine which of the one or more escalation events to provide to each of the one or more users.

* * * * *